US010168022B2

(12) United States Patent
Sun et al.

(10) Patent No.: US 10,168,022 B2
(45) Date of Patent: Jan. 1, 2019

(54) ATTACHMENT FOR ILLUMINATION DEVICE

(71) Applicant: Keyence Corporation, Osaka (JP)

(72) Inventors: Zhuoli Sun, Osaka (JP); Taku Kawai, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/925,801

(22) Filed: Mar. 20, 2018

(65) Prior Publication Data

US 2018/0313520 A1 Nov. 1, 2018

(30) Foreign Application Priority Data

Apr. 29, 2017 (JP) .................................. 2017-090874

(51) Int. Cl.
| | |
|---|---|
| *F21V 29/70* | (2015.01) |
| *F21V 23/00* | (2015.01) |
| *F21V 7/04* | (2006.01) |
| *F21V 3/02* | (2006.01) |
| *F21V 11/00* | (2015.01) |

(Continued)

(52) U.S. Cl.
CPC .................. *F21V 7/04* (2013.01); *F21V 3/02* (2013.01); *F21V 11/00* (2013.01); *G03B 15/02* (2013.01); *F21V 17/12* (2013.01); *F21Y 2105/18* (2016.08); *F21Y 2115/10* (2016.08)

(58) Field of Classification Search
CPC ... F21V 7/04; F21V 11/00; F21V 3/02; F21V 17/12; G03B 15/02; F21Y 2115/10; F21Y 2105/18
See application file for complete search history.

(56) References Cited

U.S. PATENT DOCUMENTS

| 2012/0236563 A1* | 9/2012 | Breidenassel ........... F21V 17/12 |
| | | 362/249.02 |
| 2013/0120973 A1* | 5/2013 | Chen ..................... F21V 21/044 |
| | | 362/147 |

(Continued)

FOREIGN PATENT DOCUMENTS

JP          2014-055916          3/2014

OTHER PUBLICATIONS

U.S. Appl. No. 15/925,805, filed Mar. 20, 2018 (97 pages).

(Continued)

*Primary Examiner* — Tracie Y Green
(74) *Attorney, Agent, or Firm* — Kilyk & Bowersox, P.L.L.C.

(57) ABSTRACT

There is provided an attachment for an illumination device which can change a ring-shaped illumination device to a dome-shaped illumination device. An attachment for dome illumination includes: a dome member made of a material that transmits and diffuses light emitted from a light emitting opening section of the ring-shaped illumination device inwardly; a plate member connected to the dome member, and connected to a main case so as not to form a gap when the attachment for dome illumination is fitted to the ring-shaped illumination device; and a dome cover which holds the dome member and the plate member so as to shield the space formed by the dome member, the plate member, and the light emitting opening section from light when the attachment for dome illumination is fitted to the ring-shaped illumination device.

9 Claims, 17 Drawing Sheets

(51) Int. Cl.
*G03B 15/02* (2006.01)
*F21V 17/12* (2006.01)
*F21Y 105/18* (2016.01)
*F21Y 115/10* (2016.01)

(56) References Cited

U.S. PATENT DOCUMENTS

2014/0063810 A1* 3/2014 Randolph ................. F21K 9/00
362/294
2014/0268768 A1* 9/2014 Holland .................... F21K 9/30
362/249.02
2015/0276198 A1* 10/2015 Hata .................... H01L 25/0753
362/382
2015/0285460 A1* 10/2015 Langhart ............... F21V 7/0025
362/304

OTHER PUBLICATIONS

U.S. Appl. No. 15/925,804, filed Mar. 20, 2018 (75 pages).
U.S. Appl. No. 15/925,803, filed Mar. 20, 2018 (100 pages).
U.S. Appl. No. 15/925,802, filed Mar. 20, 2018 (85 pages).

* cited by examiner

ATTACHMENT FOR ILLUMINATION DEVICE

CROSS-REFERENCE TO RELATED APPLICATIONS

The present application claims foreign priority based on Japanese Patent Application No. 2017-090874, filed Apr. 29, 2017, the contents of which is incorporated herein by reference.

BACKGROUND OF THE INVENTION

1. Field of the Invention

The invention relates to an attachment for an illumination device which has a simple configuration and can change a ring-shaped illumination device to a dome-shaped illumination device, which are different types of illumination devices.

2. Description of Related Art

In an appearance inspection apparatus which performs appearance inspection of a workpiece to be inspected, a plurality of different types of illumination devices is selectively used depending on characteristics of a workpiece such as specular reflection characteristics of the surface of the workpiece, from the viewpoint of enabling observation of the surface of the workpiece. Examples of types of illumination devices include a ring-shaped illumination device and a dome-shaped illumination device. The ring-shaped illumination device irradiates a workpiece with light emitted from annularly arranged LEDs from all directions. Thus, the workpiece can be irradiated with uniform light. The dome-shaped illumination device diffuses light from annularly arranged LEDs by using a hemispherical dome-shaped diffusion plate, and irradiates a workpiece with the diffused light. Thus, the workpiece can be irradiated with indirect light. As described, different types of illumination devices are prepared, and the respective illumination devices are selectively used depending on the surface characteristics of a workpiece to be inspected.

Japanese Patent JP-A-2014-055916 is example of the related art.

However, in a case where a user uses an appearance inspection apparatus to perform an appearance inspection of a workpiece by using an image acquired by an imaging unit, it is difficult for the user to easily find an optimal illumination device according to the surface characteristics of the workpiece. Therefore, an appropriate illumination device is selected by connecting each of the different types of illumination devices as described above to the appearance inspection apparatus, performing a trial inspection, and comparing captured images. Therefore, it takes time and trouble to determine an appropriate illumination device, and it may be necessary to purchase even an illumination device which is never used in order to find an optimal illumination device.

SUMMARY OF THE INVENTION

An object of the invention is to provide an attachment for an illumination device which has a simple configuration and can change a ring-shaped illumination device to a dome-shaped illumination device, which are different types of illumination devices.

According to one embodiment of the invention, an attachment for an illumination device is detachably attached to a ring-shaped illumination device including: a main case that includes a first opening section which is a substantially circular opening formed on an upper surface, a second opening section which is a substantially circular opening formed on a lower surface and which has a first center axis common to the first opening section, and a first hollow section which includes the first center axis and is connected to the first opening section and the second opening section; a plurality of light-emitting elements that is annularly arranged in the main case so as to surround the first hollow section; and a light emitting opening section which is an opening having a substantially annular shape whose center is located on the first center axis and having a width in a vertical direction of the main case, the light emitting opening section guiding light emitted from the plurality of light emitting elements downward of the first center axis from the first hollow section. The attachment for the illumination device includes: a dome member that includes a small-diameter opening section which has an substantially annular shape and has an opening diameter smaller than a diameter of the first opening section of the ring-shaped illumination device, a large-diameter opening section which has a substantially annular shape, has a second center axis common to the small-diameter opening section, and has an opening diameter larger than the opening diameter of the small-diameter opening section, and a side-surface section which has a contour shape widening from the small-diameter opening section to the large-diameter opening section along the second center axis and has a second hollow section inside, and at least a part of which transmits light from outside while diffusing the light to the second hollow section, the small-diameter opening section being inserted into the first hollow section of the ring-shaped illumination device from the second opening section to the first opening section of the ring shaped illumination device in a state where the second center axis common to the small-diameter opening section and the large-diameter opening section substantially matches the first center axis of the ring-shaped illumination device when the attachment for the illumination device is fitted to the ring-shaped illumination device; and a first shielding member that includes a first inner peripheral end section which is connected to the small-diameter opening section of the dome member after the dome member is fitted to the ring-shaped illumination device, extends over an entire periphery from the first inner peripheral end section in a direction perpendicular to the center axis of the small-diameter opening section, covers a space formed between an annular end section of the small-diameter opening section of the dome member and an annular end section of the first opening section of the ring-shaped illumination device, and is connected to the ring-shaped illumination device. The annular end section of the large-diameter opening section of the dome member may engage with the ring-shaped illumination device so as to cover a space formed between the annular end section of the large-diameter opening section and the annular end section of the second opening section of the ring-shaped illumination device when the dome member is fitted to the ring-shaped illumination device. According to the above configuration, the ring-shaped illumination device can be changed into a dome-shaped illumination device with a simple configuration. In addition, according to the above configuration, by fitting the attachment for the illumination device to the ring-shaped illumination device, only light emitted from the light emitting opening section of the ring-shaped illumination device can be incident on the dome member.

In addition, according to another embodiment of the invention, the attachment for the illumination device may further include a second shielding member that includes a second inner peripheral end section connected to the large-diameter opening section of the dome member when the dome member is fitted to the ring-shaped illumination device, extends over an entire periphery from the second inner peripheral end section in a direction perpendicular to the center axis of the small-diameter opening section, covers a space formed between the annular end section of the large-diameter opening section of the dome member and the annular end section of the second opening section of the ring-shaped illumination device, and is connected to the ring-shaped illumination device.

Furthermore, according to still another embodiment of the invention, in the attachment for the illumination device, the light emitting opening section of the ring-shaped illumination device may have a first opening end section and a second opening end section which are substantially annular shaped end sections whose centers are on the center axis of the first hollow section, and which are provided on an upper limit and a lower limit of a light emission location, respectively, along an inner periphery of the main case. When the attachment for the illumination device is fitted to the ring-shaped illumination device, the first shielding member may be connected at one of a height position equal to a height position of the first opening end section and a height position higher than the first opening end section, and the large-diameter opening section of the dome member may be connected at one of a height position equal to a height position of the second opening end section and a height position lower than the second opening end section. With the above configuration, a decrease in the amount of light incident on the dome member can be reduced.

Furthermore, according to still another embodiment of the invention, in the attachment for the illumination device, the first shielding member may be connected at one of the height position equal to the height position of the first opening section and the height position lower than the first opening section, and the large-diameter opening section of the dome member may be connected at one of the height position of the second opening section and the height position higher than the second opening section.

Furthermore, according to still another embodiment of the invention, in the attachment for the illumination device, the small-diameter opening section of the dome member may be positioned lower than a light-emitting element arrangement surface on which the plurality of light emitting elements is arranged. With the above configuration, light emitted downward from the plurality of light-emitting elements can be efficiently guided to the dome member.

Furthermore, according to still another embodiment of the invention, in the attachment for the illumination device, the large-diameter opening section of the dome member may have a diameter substantially identical to the diameter of the second opening section. With the above configuration, a preferable illumination range can be secured and light passed through the dome member can be made more uniform.

Furthermore, according to still another embodiment of the invention, in the attachment for the illumination device, in a case where the dome member includes an extended section which is extended upward with respect the first shielding member, the extended section may not transmit light. With the above configuration, even in a case where the dome member includes the extended section located above the first shielding member, ambient light can be prevented from passing through the dome member and being diffused.

Furthermore, according to still another embodiment of the invention, in the attachment for the illumination device, when the attachment for the illumination device is fitted to the ring-shaped illumination device, a reflecting member may be fitted to a member constituting a light shielding space formed between the light emitting opening section and the dome member. With the above configuration, light can be efficiently guided to the dome member.

Furthermore, according to still another embodiment of the invention, the attachment for the illumination device may further include a second fixing section which detachably engages with a first fixing section provided outside the main case.

DETAILED DESCRIPTION OF PREFERRED EMBODIMENTS

Figure 1:
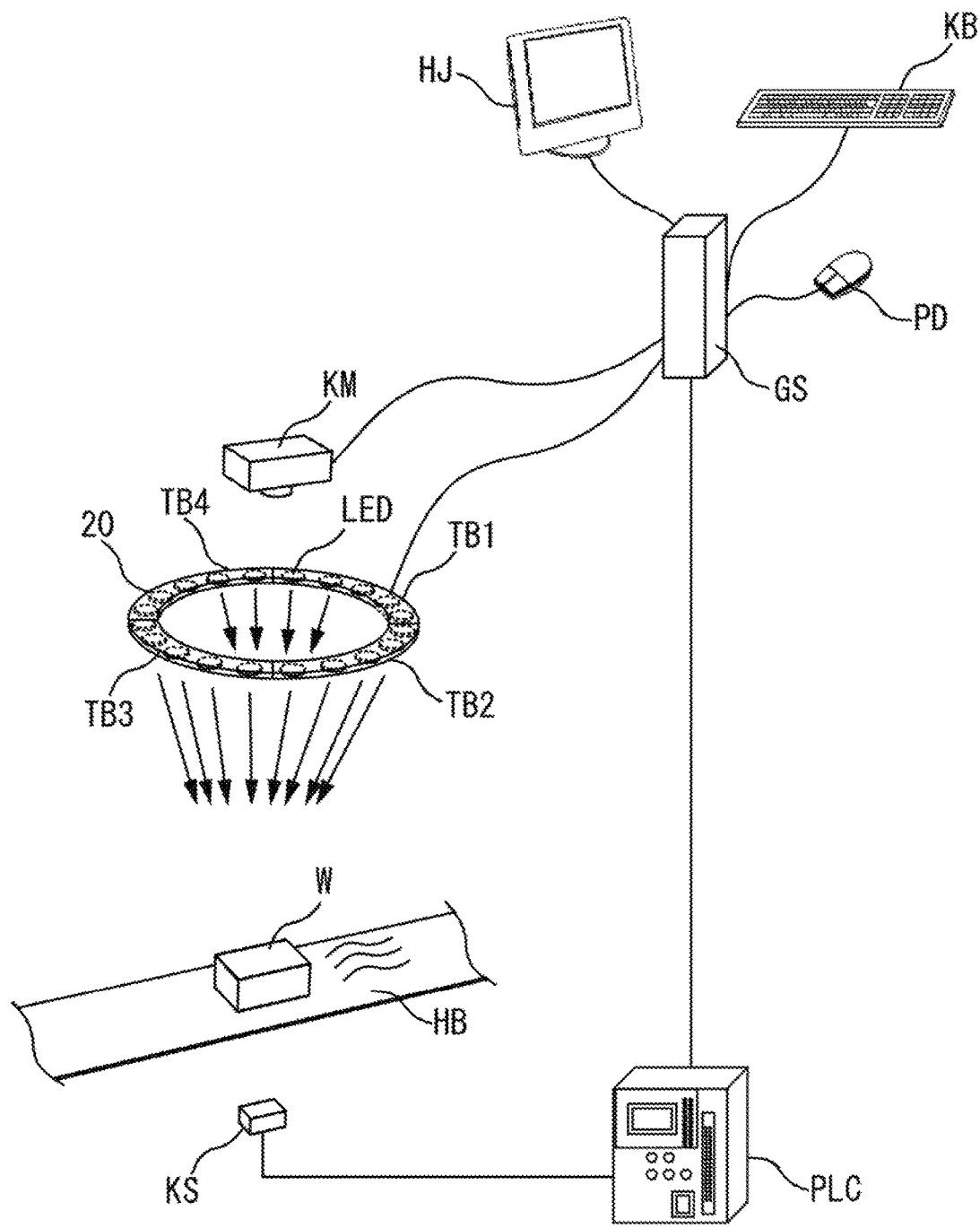
FIG. 1 is a system configuration view illustrating a configuration of an appearance inspection apparatus according to a first embodiment of the invention.

Embodiments of the invention will be described below with reference to the drawings. However, the following embodiments are examples for embodying the technical idea of the invention, and the invention is not limited to the following. In addition, the specification never specifies members described in the claims to members of the embodiments. Particularly, dimensions, materials, shapes, relative arrangements, and the like of constituents described in the embodiments are not intended to limit the scope of the invention only to them unless otherwise specifically stated, are illustrative examples only. Note that the sizes and positional relationships of the members illustrated in the drawings may be exaggerated in order to clarify the explanation. Further, in the following description, identical names and reference signs denote identical or similar member, and detailed explanation of them will be appropriately omitted. Furthermore, regarding each element constituting the invention, an aspect may be adopted in which a plurality of elements is configured of an identical member so that the one member functions as the plurality of elements. In contrast, the function of one member may be realized by a plurality of elements cooperatively.

System Configuration of Appearance Inspection Apparatus

FIG. 1 is a view illustrating an example of an appearance inspection system. An appearance inspection line includes a conveyance belt HB for conveying a workpiece W to be inspected. An illumination device 20 is a substantially annular illumination unit 20 illuminating the workpiece W, and includes a plurality of LEDs (basic light sources) having different wavelengths. The illumination unit 20 is divided into a plurality of lighting blocks TB1 to TB4 in the peripheral direction, and LEDs of respective wavelengths are arranged in each of the lighting blocks TB1 to TB4. A camera KM is an imaging unit KM which receives reflected light from the illuminated workpiece W and generates a luminance image, and is disposed on the center axis of the substantially annular illumination unit 20. An image processing device GS controls the illumination device 20 and the imaging device KM to perform image processing such as edge detection and area calculation, and determines pass or fail of the workpiece W. A PLC (Programable Logic Controller) is connected to the image processing device GS.

When it is detected by a photoelectric sensor KS or the like connected to the PLC and provided at a predetermined location on the appearance inspection line that the workpiece W arrives on the center axis of the substantially annular illumination device 20 or at a predetermined location upstream of the illumination device 20, the PLC transmits a trigger signal to the image processing device GS. When the image processing device GS receives the trigger signal from the PLC, the image processing device GS turns on the illumination device 20 at a timing when the workpiece W is conveyed to a location where the workpiece W can be illuminated by the illumination device 20, preferably at a timing when the workpiece W is conveyed to the central section of the substantially annular illumination unit 20, and causes the camera KM to capture an image at a timing when the workpiece W is illuminated by the illumination device 20. The image processing device GS executes image processing by using an image acquired by the camera KM, and outputs a determination signal to a control apparatus such as the externally connected PLC, the determination signal indicating a determination result on whether or not the workpiece W is a non-defective product as a result of appearance inspection. A display unit HJ is connected to the image processing device GS and displays a user interface for setting a control parameter related to inspection, the image of the workpiece W, the result of appearance inspection of the workpiece W, and the like. An input unit is a console, a pointing device PD, a keyboard KB, or the like, is connected to the image processing device GS, and is used for setting the control parameter.

Arrangement of Ring-Shaped Illumination Device 20

Figure 2:
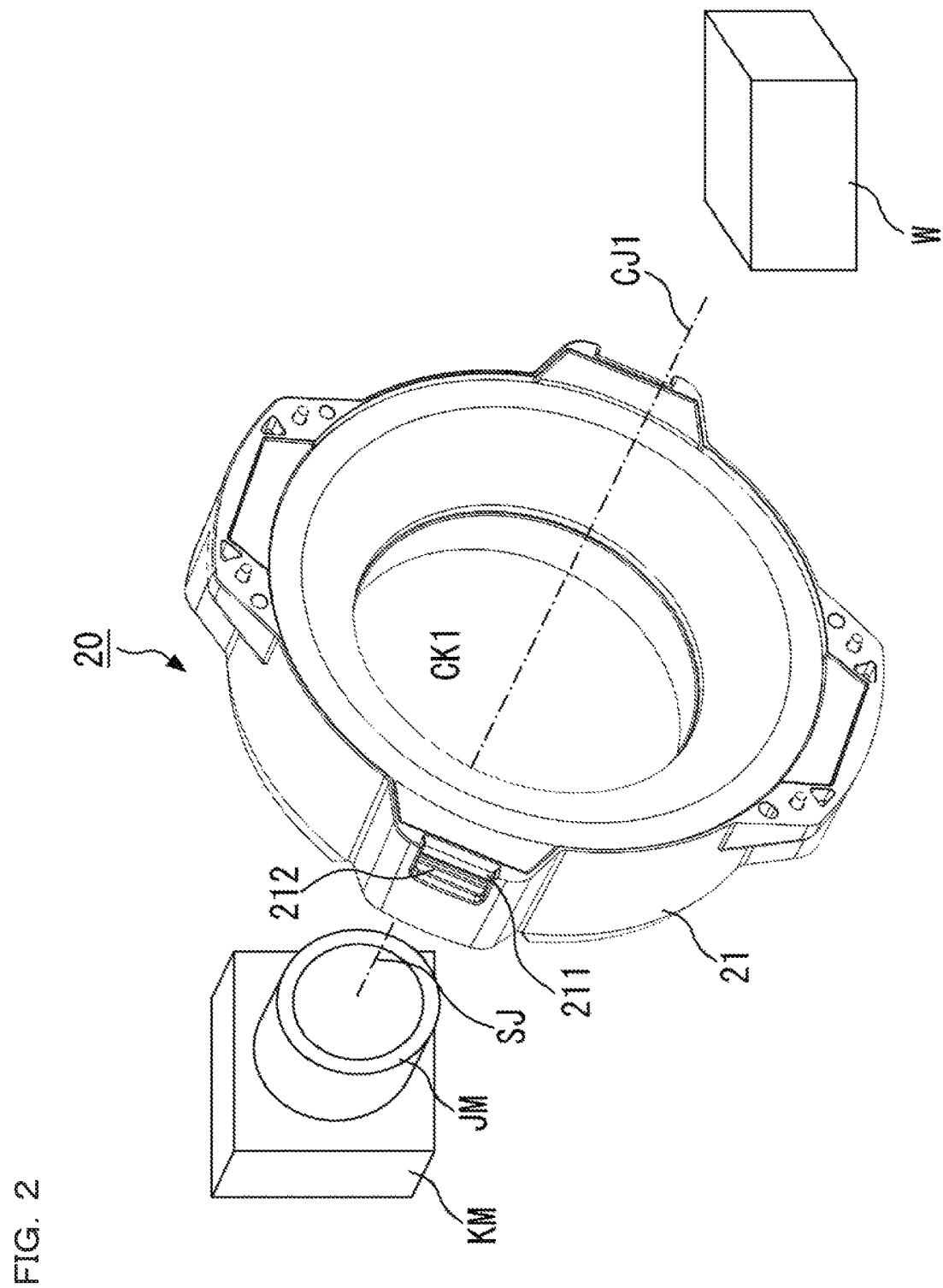
FIG. 2 is a perspective view illustrating a use state of a ring-shaped illumination device according to the first embodiment of the invention.

FIG. 2 is a perspective view illustrating arrangement of the ring-shaped illumination device 20, which is the illumination unit 20, the imaging unit KM, and the workpiece W. As illustrated in FIG. 2, the ring-shaped illumination device 20 has a substantially annular shape, and a plurality of LEDs 221 (see FIG. 3) is annularly arranged on an identical plane. A center axis CJ1 (corresponding to an example of a "first center axis" in the claims) of the ring-shaped illumination device 20, perpendicular to a plane on which the plurality of LEDs 221 is arranged (hereinafter referred to as an "LED arrangement surface 22", corresponding to an example of a "light-emitting element arrangement surface" in the claims) is located at the center of the annular shape formed by the plurality of LEDs 221.

As illustrated in FIG. 2, the imaging device KM is arranged along the center axis CJ1 such that an imaging optical axis SJ of the imaging device KM matches the center axis CJ1 of the ring-shaped illumination device 20, in a space on one side with respect to the ring-shaped illumination device 20, that is, the space on a back surface side of the ring-shaped illumination device 20 (non-light-emission direction from the ring-shaped illumination device 20). In contrast, the workpiece W which is illuminated by the ring-shaped illumination device 20 and an image of which is captured by the imaging unit KM is arranged on the center axis line of the ring-shaped illumination device 20, in a space on the other side with respect to the ring-shaped illumination device 20, that is, the space on a front surface side with respect the ring-shaped illumination device 20

(light-emission direction from the ring-shaped illumination device 20), along the center axis CJ1 of the ring-shaped illumination device 20.

In the ring-shaped illumination device 20, a circular hollow section CK1 (corresponding to an example of a "first hollow section" in the claims) is formed on the center axis CJ1 of the ring-shaped illumination device 20. The center axis CJ1 of the ring-shaped illumination device 20 substantially matches the center axis of the hollow section CK1. The ring-shaped illumination device 20 includes a front surface 24 which is a plane substantially parallel to the LED arrangement surface 22 and is a surface from which light from the LEDs 221 is emitted, and a rear surface 25 which is a plane substantially parallel to the LED arrangement surface 22, faces the front surface 24, and is a surface located on the back surface side of the illumination device 20 described above (see FIG. 3).

Details of Ring-Shaped Illumination Device 20

Figure 3:
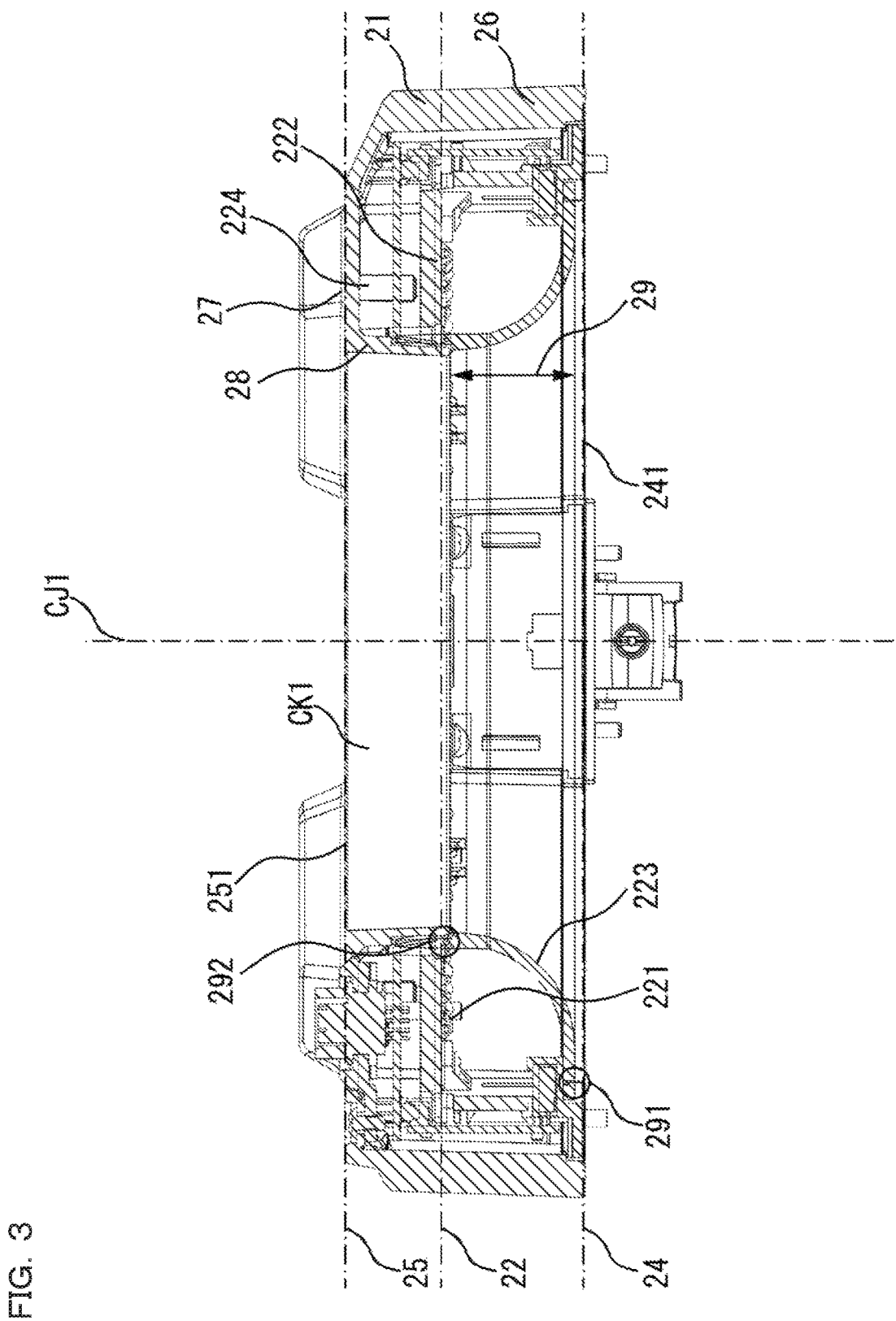
FIG. 3 is a cross-sectional view of the ring-shaped illumination device according to the first embodiment of the invention.

FIG. 3 is a cross-sectional view illustrating a cross section of the ring-shaped illumination device 20. In the following description, for the sake of convenience, with respect to the LED arrangement surface 22, the side of a space where the imaging unit KM is disposed is referred to as up and the side of a space where the workpiece W is placed disposed is referred to as down. As illustrated in FIG. 3, the ring-shaped illumination device 20 is configured of a substantially annular main case 21 having the hollow section CK1, a substantially annular illumination board 222 accommodated in the main case 21 and formed of a plane, the plurality of LEDs 221 annularly arranged on the illumination board 222, and a substantially annular diffusion cover 223 which is disposed between the LEDs 221 and the hollow section CK1, and transmits and diffuses light from the LEDs 221. The diffusion cover 223 is made of milky white acrylic resin; however, any material may be used as long as the material has a function of transmitting and diffusing light.

As a basic configuration, the main case 21 is configured of an annular outer wall section 26 which is positioned on the outer peripheral side of the annularly arranged LEDs 221 and has a fixed height for accommodating at least the LEDs 221 and the illumination board 222 in the height direction along the center axis CJ1 of the ring-shaped illumination device 20. In the present embodiment, in addition to the outer wall section 26, an upper wall section 27 is provided on the back surface side of the ring-shaped illumination device 20. The upper wall section 27 extends from the upper end section of the outer wall section 26 toward the center axis CJ1 of the hollow section CK1 and reaches the inner peripheral side of the annularly arranged LEDs 221 in order to accommodate the LEDs 221 and the illumination board 222. The upper wall section 27 is substantially parallel to the LED arrangement surface 22. In addition, in order to prevent part of the light emitted from the LEDs 221 from becoming a stray light and entering the back surface side of the illumination board 222, an inner wall section 28 is provided. The inner wall section 28 extends downward from an end section on the inner peripheral side of the upper wall section 27 to the place where the LED arrangement surface 22 is located, along the center axis CJ1 of the hollow section CK1.

The front surface 24 of the main case 21 is located on a plane located on the lower end section of the outer wall section 26, the plane being on the lower side with respect to the LED arrangement surface 22. In addition, the rear surface 25 of the main case is located on a plane which is located on the upper end section of the outer wall section 26, and on which the upper wall section 27 is provided, the plane being on the upper side with respect to the LED arrangement surface 22. On the front surface 24 of the main case 21, a front surface opening section 241 (corresponding to an example of a "second opening section in the claims) is provided. The front surface opening section 241 is connected to the hollow section CK1. The imaging optical axis SJ of the imaging unit KM passes through the front surface opening section 241 (see FIG. 2) and light from the LEDs 221 emits through the front surface opening section 241. On the rear surface 25 of the main case 21, a rear surface opening section 251 (corresponding to an example of a "first opening section" in the claims) is provided. The rear surface opening section 251 is connected to the hollow section CK1. The imaging optical axis SJ of the imaging unit KM passes through the rear surface opening section 251. The front surface opening section 241 has a substantially circular shape, and the center of the front surface opening section 241 is located on the center axis CJ1 of the hollow section CK1. The rear surface opening section 251 has a substantially circular shape, and the center of the front surface opening section 251 is located on the center axis CJ1 of the hollow section CK1.

In other words, by connecting the front surface opening section 241 of the front surface 24 of the main case 21 and the rear surface opening section 251 of the rear surface 25 of the main case 21, the hollow section CK1 of the main case 21 is formed between the front surface opening section 241 and the rear surface opening section 251. The diameter of the front surface opening section 241 is set to be larger than the diameter of the rear surface opening section 251.

The main case 21 has a light emitting opening section 29 through which light emitted from the plurality of LEDs 221 annularly arranged in the main case 21 is emitted in the center axis CJ1 direction obliquely downward via the hollow section CK1. The light emitting opening section 29 has an annular shape in which the height of the opening section is defined as an interval between a light emitting front end section 291 (corresponding to an example of a "second opening end section" in the claims) and a light emitting rear end section 292 (corresponding to an example of a "first opening end section" in the claims). The light emitting front end section 291 is provided at a first distance from the LED arrangement surface 22 toward the front surface 24 of the main case 21 along the center axis CJ1 of the hollow section CK1 in the main case 21, and is positioned on an identical circle about the center axis CJ1 of the hollow section CK1. The light emitting rear end section 292 is provided at a second distance from the light emitting front end section 291 toward the LED arrangement surface 22 along the center axis CJ1 of the hollow section CK1 in the main case 21, and is positioned on an identical circle about the center axis CJ1 of the hollow section CK1.

In the present embodiment, on the outer wall section 26 of the main case 21, the light emitting front end section 291 is provided on the front surface 24 of the main case 21, separated by the first distance from the LED arrangement surface 22. In addition, on the inner wall section 28 of the main case 21, the light, emitting rear end section 292 is provided on the LED arrangement surface 22, separated by the second distance from the light emitting front end section 291.

The diffusion cover 223 which has a curved cross section and is annular in plan view is provided so as to cover the light emitting opening section 29 from the light emitting front end section 291 to the light emitting rear end section 292. In the present embodiment, the diffusion cover 223 extends over the entire periphery from the light emitting rear end section 292 located on the LED arrangement surface 22 of the inner wall section 28 to the light emitting front end section 291 located on the outer wall section 26 on the front surface 24 side of the main case 21 with respect to the light emitting rear end section 292. When the plurality of LEDs 221 arranged on the illumination board 222 emits light, the light is emitted toward the front surface 24 of the main case, is diffused by passing through the diffusion cover 223, passes through the hollow section CK1, and is emitted in the center axis CJ1 direction obliquely downward.

In the present embodiment, the main case 21 further includes an illumination board support section 224 that connects one end to the upper wall section 27 and the other end to the illumination board 222, and supports the illumination board 222 on the upper wall section 27. The illumination board 222 is supported by the illumination board support section 224 at a location substantially identical to the position of a lower end section of the inner wall section 28 of the main case 21 along the center axis CJ1 of the hollow section CK1 of the main case 21, and is disposed in the main case 21. As a specific support structure, the illumination board support section 224 has a cylindrical shape, has a cylindrical hollow section in the longitudinal direction inside the illumination board support section 224, and opens at an end section supporting the illumination board 222. Therefore, by providing an opening on a side of the illumination board 222, corresponding to the illumination board support section 224, and fastening a screw in the cylindrical hollow section of the illumination board support section 224 via the opening section of the illumination board 222, the illumination board 222 can be fixed to the illumination board support section 224. However, the support structure is not limited to this configuration. The illumination board support section 224 may be fitted to the outer wall section 26 of the main case 21, and the illumination board 222 may be fitted to the illumination board support section 224 fitted to the outer wall section 26. The illumination board support section 224 may be fitted to the inner surface of the inner wall section 28 and the illumination board 222 may be fitted to the illumination board support section 224 fitted to the inner wall section 28. In a case where the illumination board support section 224 is provided on the outer wall section 26 or the inner wall section 28, in addition to the above-described configuration, the specific configuration of the illumination board support section 224 may be a configuration where a stepped section or a slit section which has a continuous ring shape and holds the illumination board 222 is formed on the inner peripheral surface of the outer wall section 26 or the inner wall section 28. Any support structure may be adopted as long as the illumination board 222 can be positioned with respect to the main case 21 and can be supported.

Figure 4:
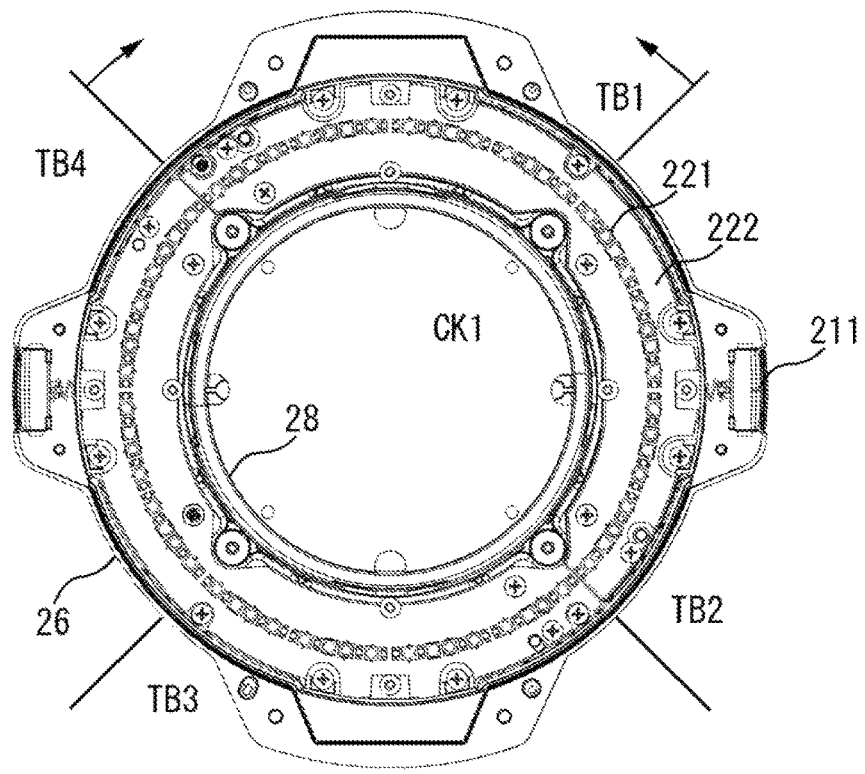
FIG. 4 is a plan view of the ring-shaped illumination device according to the first embodiment of the invention.

FIG. 4 is a plan view of the ring-shaped illumination device 20 in a state where the diffusion cover 223 is removed. The plurality of LEDs 221 emitting light of different wavelengths is annularly arranged adjacent to each other on the illumination board 222 having an annular shape substantially identical to the shape of the upper wall section 27 of the main case 21. The plurality of lighting blocks TB1 to TB4 which can be turned on and off independently can be configured by dividing the ring-shaped illumination device 20 in the peripheral direction. In the present embodiment, the ring-shaped illumination device 20 is divided into four pieces on the circumference to provide the four lighting blocks TB1 to TB4. In addition, in the present embodiment, each of the lighting blocks TB1 to TB4 includes eight types of LEDs 221 that emit light of different wavelengths. In more detail, four LEDs 221 having the respective wavelengths are arranged in each lighting block TB. With this configuration, the ring-shaped illumination device 20 can turn on the LED 221 of the selected wavelength in each lighting block TB.

By turning on the LEDs 221 of the selected wavelength at the same time in all the lighting blocks TB1 to TB4, the workpiece W positioned on the center axis CJ1 of the hollow section CK1 of the main case 21 can be irradiated with illumination light from all directions. Alternatively, by switching from one light block TB to another lighting block TB and turning on the LED 221 of the selected wavelength, the workpiece W positioned on the center axis CJ1 of the hollow section CK1 of the main case 21 can be irradiated with illumination light from a different illumination direction.

A fixing section 211 (corresponding to an example of a "first fixing section" in the claims) for fitting a dome cover 41 to be described later is provided on the main case 21 on the outer peripheral side of the light emitting front end section 291. In the present embodiment, the two fixing section 211 are provided on a diagonal line on the outer peripheral surface of the outer wall section 26 of the main case 21, and each fixing section 211 includes an engagement groove 212 (see FIG. 2) having a groove. When a key section 416 (see FIGS. 8 and 9) of a lock lever 415 of the dome cover 41 engages with the engagement groove 212, the dome cover 41 and the main case 21 are fixed to each other. However, the invention is not limited to this configuration, and an engagement groove may be formed in the dome cover 41 and a lock lever may be provided on the main case 21.

Change from Ring-Shaped Illumination Device 20 to Dome-Shaped Illumination Device 60

When the dome member 42 and a plate member 51 (corresponding to an example of a "first shielding member" in the claims) and the dome cover 41 (corresponding to an example of a "second shielding member" in the claims) to be described later are integrated as an attachment 40 for dome illumination and are fitted to the ring-shaped illumination device 20, the ring-shaped illumination device 20 can be changed to the dome-shaped illumination device 60. Each member will be described below.

Dome Member 42

Figure 5:
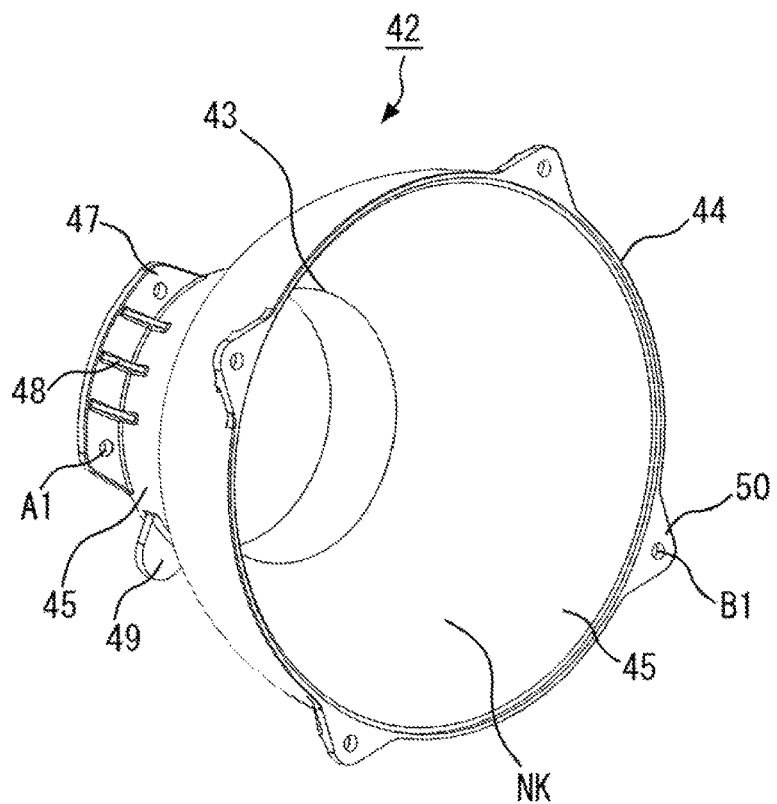
FIG. 5 is a perspective view of a dome member according to the first embodiment of the invention.
Figure 6:
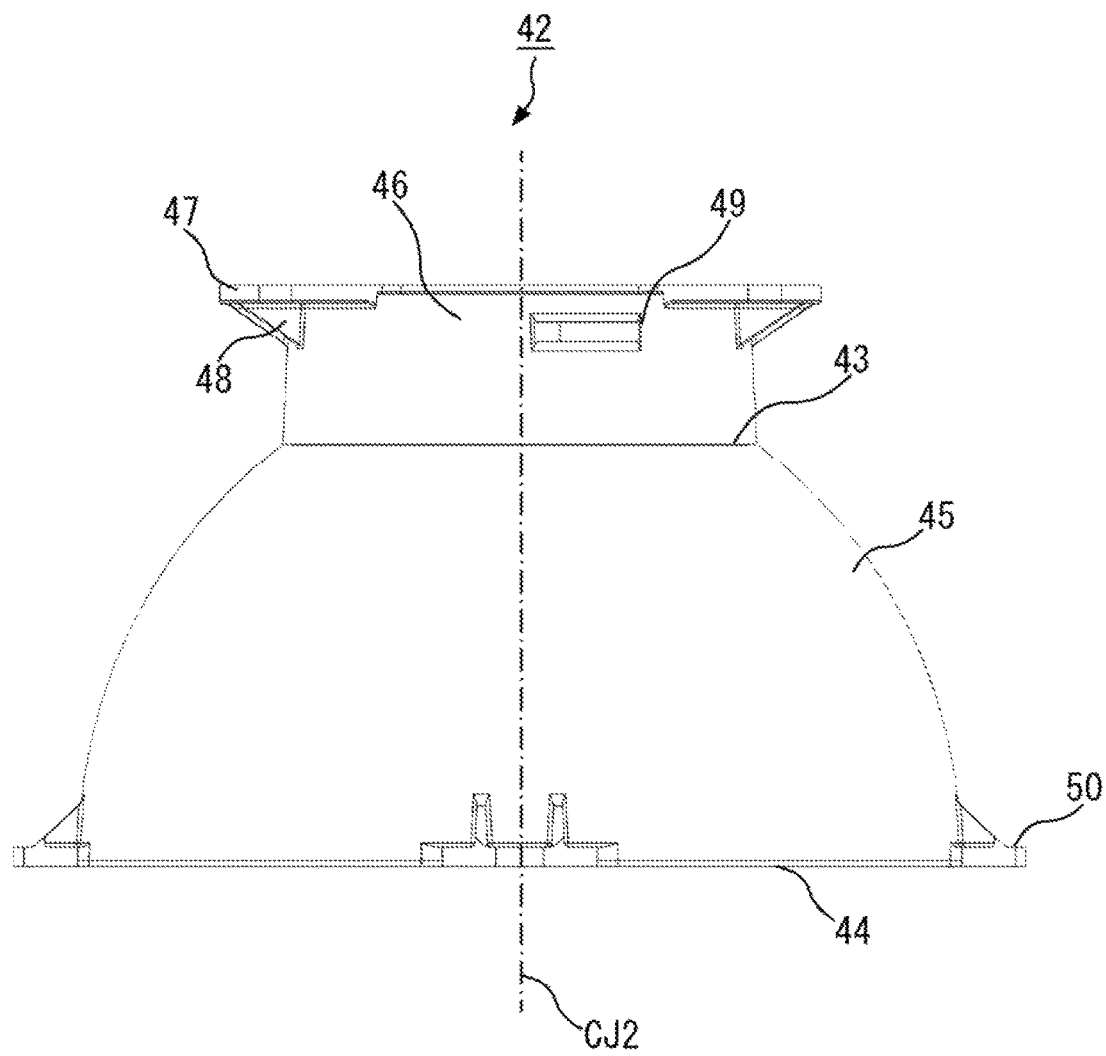
FIG. 6 is a front view of the dome member according to the first embodiment of the invention.

With reference to FIGS. 5 and 6, the dome member 42 will be described. FIG. 5 is a perspective view of the dome member 42, and FIG. 6 is a side view of the dome member 42. The dome member 42 is a main component for changing the ring-shaped illumination device 20 to the dome-shaped illumination device 60. The dome member 42 is a member for transmitting light from the LEDs 221 of the ring-shaped illumination device 20 and for emitting diffused light in a fitted state. The dome member 42 includes a substantially circular small-diameter section 43 (corresponding to an example of a "small-diameter opening section" in the claims) having a diameter smaller than the diameter of the rear surface opening section 251 of the main case 21 of the ring-shaped illumination device 20, and a large-diameter section 44 (corresponding to an example of a "large-diameter opening section" in the claims) having a relatively larger diameter than the diameter of the small-diameter section 43. The dome member 42 has a substantially trapezoidal shape in side view since the diameter increases as proceeding from the small-diameter section 43 to the large-diameter section 44. Therefore, a substantially trapezoidal internal space NK (corresponding to an example of a "second hollow section" in the claims) is formed inside the dome member 42. At least part of a section having the substantially trapezoidal shape in side view extending from the small-diameter section 43 to the large-diameter section 44 of the dome member 42 is configured of a member which allows light to pass through and to be diffused.

More specifically, when the dome member 42 is assembled to the ring-shaped illumination device 20, after the dome member 42 is positioned such that the small-diameter section 43 of the dome member 42 faces the front surface opening section 241 of the ring-shaped illumination device 20 and a center axis CJ2 (corresponding to an example of a "second center axis" in the claims) of the dome member 42 and the center axis CJ1 of the ring-shaped illumination device 20 are positioned on an identical axis line, the small-diameter section 43 of the dome member 42 is inserted into the hollow section CK1 of the ring-shaped illumination device 20 along the identical axis line. Thus, the small-diameter section 43 of the dome member 42 is positioned in the hollow section CK1 of the ring-shaped illumination device 20. Therefore, the diameter of the small-diameter section 42 of the dome member 42 needs to be smaller than the diameter of the front surface opening section 241 and the diameter of the rear surface opening section 251 of the ring-shaped illumination device 20.

A plane on which the large-diameter section 44 is provided is positioned so as to be substantially parallel to a plane on which the small-diameter section 43 is provided. The dome member 42 has the center axis CJ2 that is substantially perpendicular to the plane on which the small-diameter section 43 is disposed and the plane on which the large-diameter section 44 is disposed, and passes through the center of the small-diameter section 43 and the center of the large-diameter section 44. In the present embodiment, the dome member 42 has a dome-shaped section 45 (corresponding to an example of a "side-surface section" in the claims) having a curved shape projecting from inside to outside of the dome member 42. However, the dome member 42 is not limited to this and may be configured of a plane extending linearly. Part of the dome member 42 which transmits light is made of milky white acrylic resin; however, any material may be used as long as the material has a function of transmitting and diffusing light.

In the present embodiment, the diameter of the large-diameter section 44 of the dome member 42 is made substantially equal to the diameter of the rear surface opening section 251 of the ring-shaped illumination device 20, and light passes through the dome member 42 positioned on the inner peripheral side of the annularly arranged LEDs 221. The reason is as follows. In a case where the diameter of the large-diameter section 44 of the dome member 42 is larger than the diameter of the rear surface opening section 251 of the ring-shaped illumination device 20, part of the dome member 42 is also located immediately below the LEDs 221 arranged in the ring-shaped illumination device 20. Since light of the LEDs 221 is emitted mainly downward, a larger amount of light passes through the part of the dome member 42 located immediately below the LEDs 221, and a relatively smaller amount of light passes through the other part of the dome member 42 located on the inner peripheral side with respect to the LEDs 221. Therefore, light passed through the dome member 42 becomes nonuniform, and the workpiece W cannot be irradiated with uniform light. In contrast, in a case where the diameter of the large-diameter section 44 of the dome member 42 is smaller than the diameter of the rear surface opening section 251 of the ring-shaped illumination device 20, the workpiece W which can be inspected with the ring-shaped illumination device 20 cannot be inspected with the dome-shaped illumination device 60 since it is necessary to cast light to the entire workpiece W. Therefore, it is preferable to allow light to pass through the dome member 42 positioned on the inner peripheral side of the annularly arranged LEDs 221, for example, by making the diameter of the large-diameter section 44 of the dome member 42 substantially equal to the diameter of the rear surface opening section 251 of the ring-shaped illumination device 20.

In the present embodiment, the dome member 42 has a cylindrical extended section 46 having a cross-sectional shape identical to the cross-sectional shape of the small-diameter section 43 having a substantially circular shape. In addition, the inner shape of the extended section 46 is not limited to the cylindrical shape. The cross-section of the extended section 46 may be identical to the cross section of the small-diameter section 43 or greater than the cross section of the small-diameter section 43. As will be described in detail later, the extended section 46 is provided in order to make the light passed through the dome member 42 uniform. In a state where the extended section 46 is fitted to the ring-shaped illumination device 20, the extended section 46 causes the small-diameter section 43 of the dome member 42 to be disposed at a height equal to the height of the LED arrangement surface 22 or on the front surface 24 side of the main case 21 with respect to the LED arrangement surface 22 along the center axis CJ1 of the hollow section CK1. Similarly to the dome member 42, the extended section 46 is made of milky white acrylic resin that transmits and diffuses light; however, the extended section 46 may be provided with a reflecting member that reflects light, or a may be made of a material that does not transmit light. In addition, the extended section 46 may be formed integrally with the dome member 42, or may be formed separately from the dome member 42.

Furthermore, the columnar extended section 46 is not necessary as long as a following positional relationship can be established. In the positional relationship, when the ring-shaped illumination device 20 and the dome member 42 are combined, the height of the LED arrangement surface 22 provided in the ring-type illumination device 20 along the center axis CJ1 of the hollow section CK1 is substantially identical to the height of the small-diameter section 43 of the dome member 42 or the small-diameter section 43 is positioned on the front surface side of the ring-type illumination device 20 with respect to the LED arrangement surface 22, and the plate member 51 can be directly attached to the small-diameter section 43.

In the present embodiment, at an end section of the extended section 46, a pair of connecting sections 47 for connecting to the plate member 51 are provided on a diagonal line such that the connecting sections 47 project in the outer peripheral direction. Each connecting section 47 is provided with a plurality of triangular rib sections 48 connecting obliquely the connecting section 47 and the outer peripheral surface of the extended section 46. In addition, a projecting section 49 projecting from the outer peripheral surface of the extended section 46 in the outer peripheral direction is provided on the outer peripheral surface on an intermediate section of the extended section 46. As will be described in detail later, when the plate member 51 is fitted to the dome member 42, the plate member 51 and the dome member 42 can be positioned by the plurality of rib sections 48 and the projecting section 49. In each connecting section 47, a fastening hole A1 for fixing the plate member 51 to the dome member 42 is provided. At the large-diameter section 44, four attaching sections 50 for attaching the dome member 42 to the dome cover 41 project in the outer peripheral direction and are provided at equal intervals in the peripheral direction. A fastening hole B1 is formed in each attaching section 50.

Plate Member 51

Figure 7:
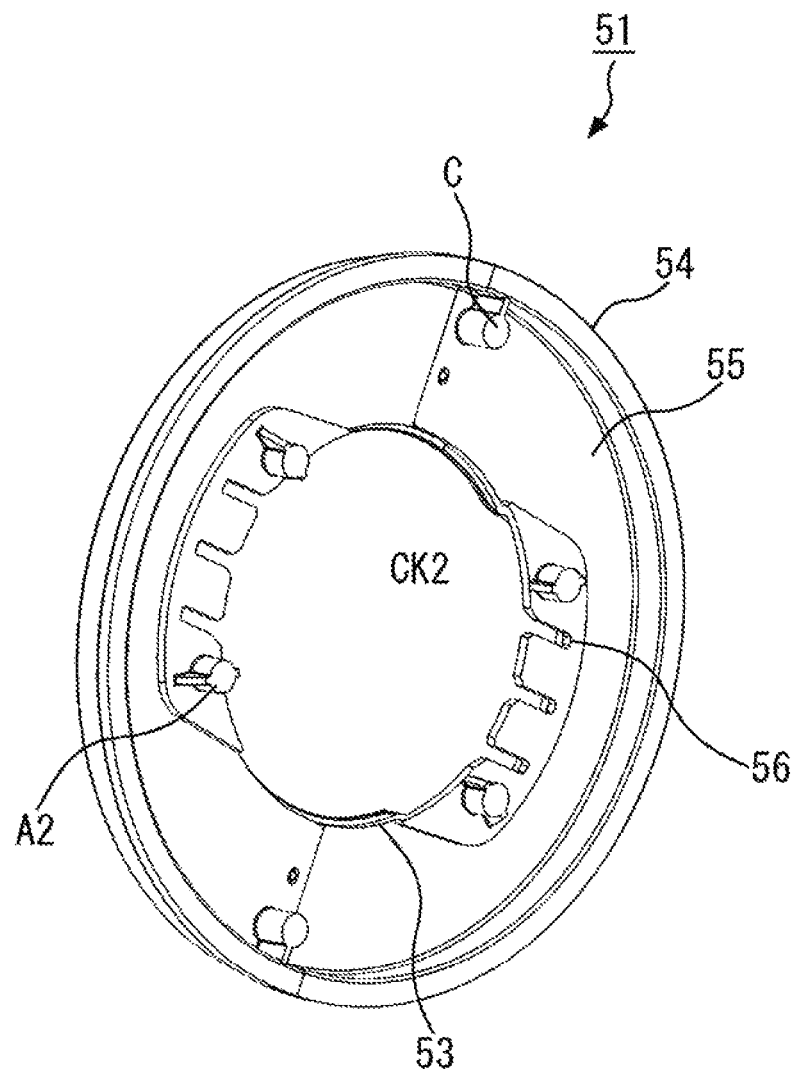
FIG. 7 is a perspective view of a plate member according to the first embodiment of the invention.

With reference to FIG. 7, the plate member 51 will be described. The plate member 51 is a member positioned in the hollow section CK1 of the ring-shaped illumination device 20 and interposed between the small-diameter section 43 of the dome member 42 and the main case 21 of the ring-shaped illumination device 20. The plate member 51 is for covering a gap formed between the small-diameter section 43 of the dome member 42 and the rear surface opening section 251 of the main case 21 of the ring-shaped illumination device 20, and blocking light.

In detail, the gap herein can be defined as a gap formed between an annular end section of the small-diameter section 43 of the dome member 42 and the annular light emitting rear end section 292 of the rear surface opening section 251 of the main case 21 of the ring-shaped illumination device 20 in a case where when the ring-shaped illumination device 20 and the dome member 42 are positioned and assembled, the combined device is seen along the center axes CJ1 and CJ2 common to the ring-shaped illumination device 20 and the dome member 42, from the back surface side (the rear surface opening section 251 side) of a ring-shaped lighting member.

In the broad sense, this gap can be also defined as a gap formed between the annular end section of the small-diameter section 43 of the dome member 42 and a rear-surface opening annular end section (corresponding to an example of an "annular end section of the first opening section" in the claims), which is the annular end section of the rear surface opening section 251. In the present embodiment, the position of the annular light emitting rear end section 292 and the position of the annular rear-surface opening annular end section match with each other. However, as will be described later, the annular end section of the small-diameter section 43 of the dome member 42 may be connected to the inner wall section 28 of the main case 21 or a rear surface 25 side of the main case 21. Therefore, in this case, the position of the light emitting rear end section 292 and the position of the rear-surface opening annular end section do not match with each other. In other words, since a rear surface opening section 251 has a thickness, the rear-surface opening annular end section of the main case 21 of the ring-shaped illumination device 20 has a width in the front-rear direction (vertical direction in the claims). Therefore, the plate member 51 positioned at a location including the light emitting rear end section 292 and integrated with the dome member 42 via the annular end section of the small-diameter section 43 of the dome member 42 and the inner peripheral end section 53 of the member 51 is connected to the rear-surface opening annular end section of the main case 21 so as to block ambient light from the rear surface 25 side.

In addition, in the present embodiment, the plate member 51 is described; however, in terms of function, as long as a shielding member covers the gap formed between the small-diameter section 43 of the dome member 42 and the light emitting rear end section 292 (in a broad sense, the rear-surface opening annular end section) of the rear surface opening section 251 of the main case 21 of the ring-shaped illumination device 20, the shape of the shielding member is not necessarily a plate shape. For example, the shape of the shielding member may be a tapered shape extending rearward (upward in the claims). That is, a "direction perpendicular to a center axis of the small-diameter opening section" in the claims means the extending direction on the XY plane in a case where it is assumed that the center axis CJ2 is the Z-axis, and may extend in the Z direction. In addition, "perpendicular" is not limited to be exactly 90°.

The plate member 51 is an annular flat plate member having a substantially circular hollow section CK2. The plate member 51 includes a substantially circular inner peripheral end section 53 (corresponding to an example of a "first inner peripheral end section" in the claims) connected to the small-diameter section 43 of the dome member 42, a substantially circular outer peripheral end section 54 connected to the inner wall section 28 of the main case 21 of the ring-shaped illumination device 20, and a plate section 55 radially extending in a plate shape over the entire periphery from the inner peripheral end section 53 in a direction perpendicular to the center axis CJ2 of the dome member 42 to the outer peripheral end section 54. The diameter of the hollow section CK2 of the plate member 51 is substantially equal to the diameter of the small-diameter section 43 of the dome member 42. In addition, the outer diameter or the size of the plate member 51 may be substantially equal to or larger than the diameter of the rear surface opening section 251 of the ring-shaped illumination device 20.

In the present embodiment, a reflecting member is fitted to one surface of the plate member 51, which is a surface facing the gap formed between the small-diameter section 43 of the dome member 42 and the light emitting rear end section 292 of the rear surface opening section 251 of the main case 21 of the ring-shaped illumination device 20, and therefore light from the gap is reflected. The plate member 51 is a split type plate member, and is integrated by inserting and fastening a fastening member such as a screw to a fastening hole C. A plurality of notches 56 for positioning by engaging with the rib sections 48 of the connecting sections 47 of the dome member 42, and a fastening hole A2 into which a fastening member such as a screw or the like is inserted in order to fix the plate member 51 to the dome member 42 are provided on the inner peripheral end section 53 of the plate member 51.

Dome Cover 41

Figure 8:
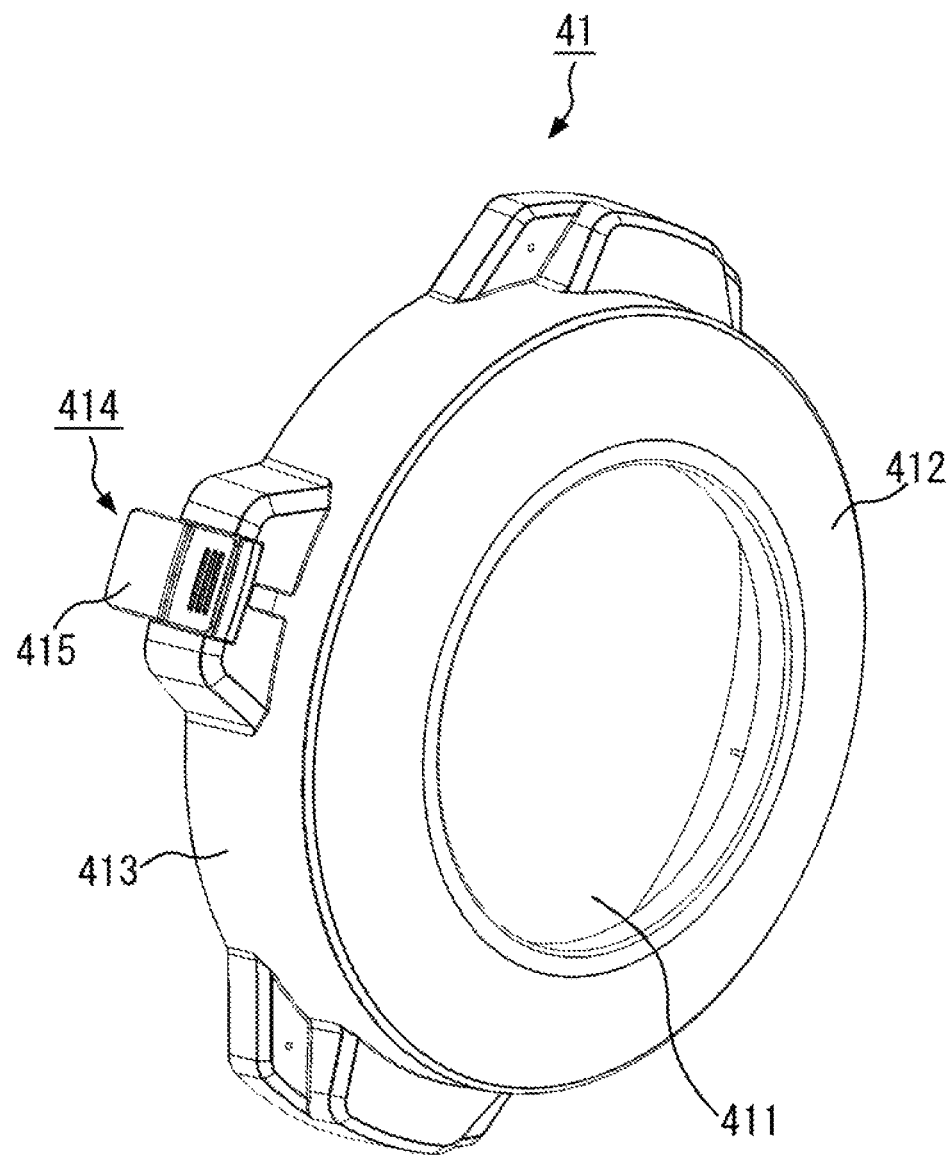
FIG. 8 is a perspective view illustrating outside of a dome cover according to the first embodiment of the invention.
Figure 9:
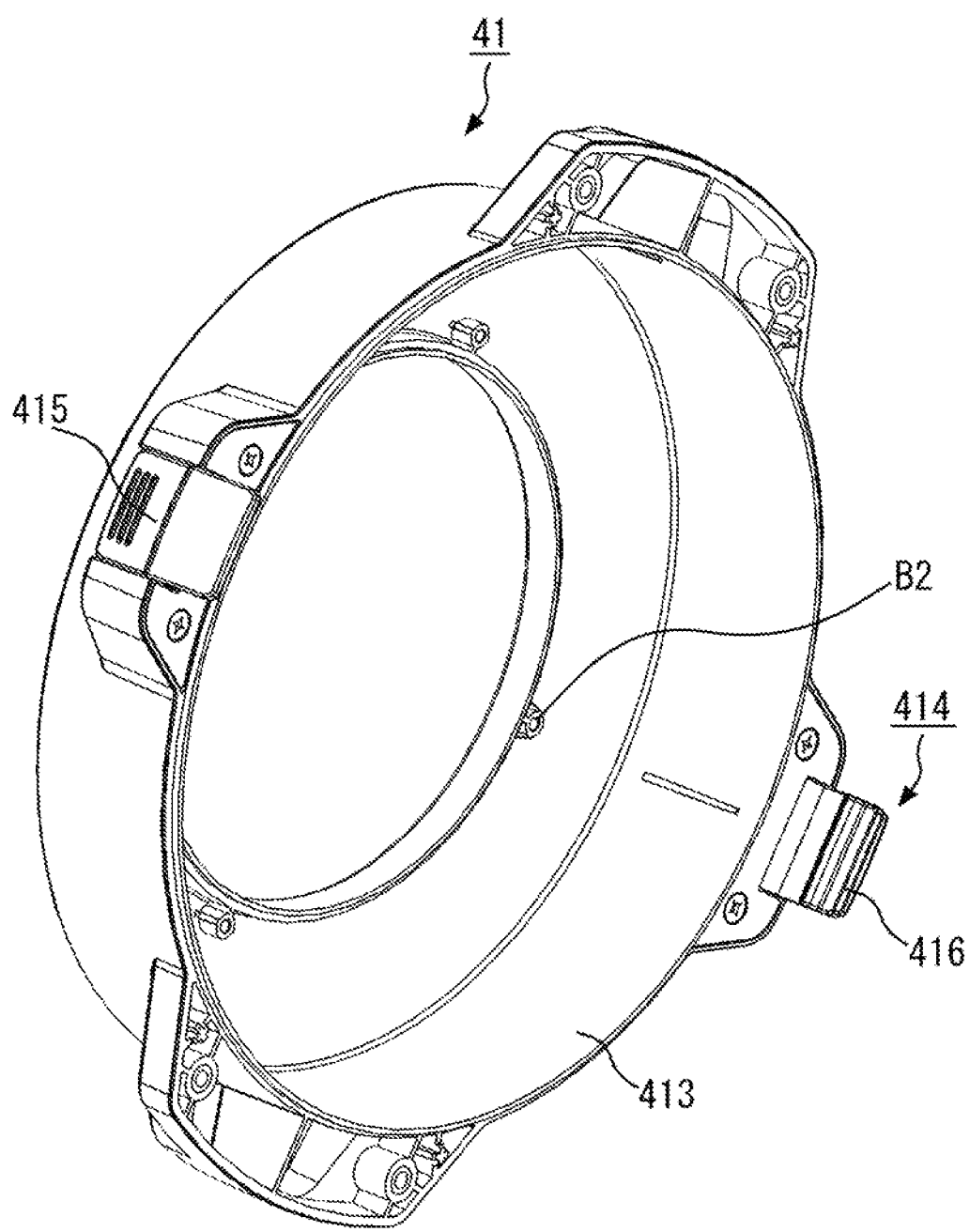
FIG. 9 is a perspective view illustrating inside of the dome cover according to the first embodiment of the invention.

The dome cover 41 will be described with reference to FIGS. 8 and 9. FIG. 8 is a perspective view illustrating the outside of the dome cover 41, and FIG. 9 is a perspective view illustrating the inside of the dome cover 41. The dome cover 41 is a member for covering the plurality of LEDs 221 in order for light from the plurality of LEDs 221 arranged in a substantially annular shape in the ring-shaped illumination device 20 to pass through the dome member 42 and to be emitted to the internal space NK of the dome member 42 when the attachment 40 for dome illumination is fitted to the ring-shaped illumination device 20. More specifically, the dome cover 41 is a member for shielding a gap from outside at the front surface 24 side of the ring-shaped illumination device 20, the gap formed between the annular end section of the large-diameter section 44 of the dome member 42 and the annular light emitting front end section 291 of the ring-shaped illumination device 20 in a case where when the ring-shaped illumination device 20 and the dome member 42 are positioned and combined, the combined device is seen along the center axes CJ1 and CJ2 common to the ring-shaped illumination device 20 and the dome member 42, from the front surface side (a front surface opening section 241 side) of the ring-shaped illumination member. The dome cover 41 has a substantially annular shape, and an opening section 411 enabling an image of the workpiece W to be captured with the imaging unit KM is formed at the center of the dome cover 41. The opening section 411 may be a circular shape having a diameter substantially identical to the diameter of the rear surface opening 251 of the ring-shaped illumination device 20, and the size of the dome cover 41 may be any as long as the dome cover 41 covers the gap formed between the above-described annular end section of the large-diameter section 44 of the dome member 42 and the annular light emitting front end section 291 of the ring-shaped illumination device 20.

In the broad sense, this gap can be also defined as a gap formed between the annular end section of the large-diameter section 44 of the dome member 42 and a front-surface opening annular end section (corresponding to an example of an "annular end section of the second opening section" in the claims), which is the annular end section of the front surface opening section 252. In the present embodiment, the position of the annular light emitting front end section 291 and the position of the annular front-surface opening annular end section match with each other. However, as will be described later, the position of the light emitting front end section 291 and the position of the front-surface opening annular end section do not match with each other in a case where the outer wall section 26 of the main case 21 of the ring-shaped illumination device 20 is extended downward to position the front surface opening section 241 further forward. In other words, the dome cover 41 is connected to the front-surface opening annular end section of the main case 21 of the ring-shaped illumination device 20 such that the dome cover 41 blocks ambient light from the front surface 24 side. The dome cover 41 is positioned at a location including the light emitting front end section 291 and is integrated with the dome member 42 via the annular end section of the large-diameter section 44 of the dome member 42 and an annular end section (corresponding an example of a "second inner peripheral end section" in the claims) of the opening section 411 of the dome cover 41.

That is, by disposing the dome cover 41 and the above-described plate member 51 on the front surface side and the back surface side of the ring-shaped illumination device 20, respectively, the space formed between the ring-shaped illumination device 20 and the dome member 42 is shielded from outside.

In the present embodiment, the dome cover 41 is configured of a substantially annular cover member 412 having a curved cross section, and an outer wall section 413 provided on an outer peripheral section of the cover member 412, which is most distant from the center of the dome cover 41 in the radial direction, the outer wall section 413 extending in a direction substantially perpendicular to the cover member 412. Note that, a "direction perpendicular to the center axis of the large-diameter opening section" in the claims means the extending direction on the XY plane in a case where it is assumed that the center axis CJ2 is the Z-axis, and may extend in the Z direction. In addition, "perpendicular" is not limited to be exactly 90°. A reflecting member is fitted inside the dome cover 41. Two fixing sections 411 (each corresponding to an example of a "second fixing section" in the claims) for fitting the main case 21 of the rink-shaped illumination device 20 are provided on a diagonal line on the outer wall section 413 of the dome cover 41. The fixing section 414 is of a lock lever type. In addition, four fastening holes B2 for fixing for fitting the large-diameter section 44 of the dome member 42 are provided at equal intervals in the peripheral direction on the outer peripheral side of the opening section 411 in the peripheral section of the opening section 411 of the dome cover 41.

Attachment 40 for Dome Illumination

Figure 10:
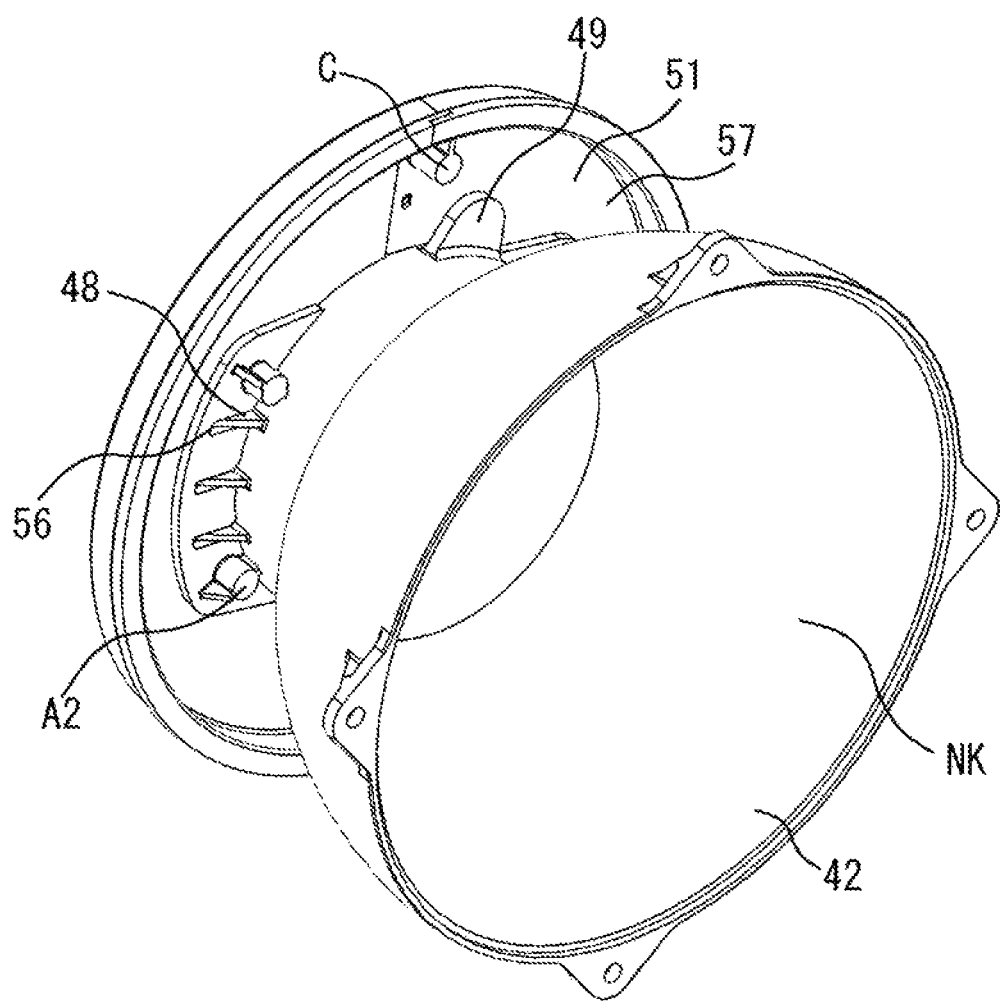
FIG. 10 is a view in which the plate member is fitted to the dome member according to the first embodiment of the invention.
Figure 11:
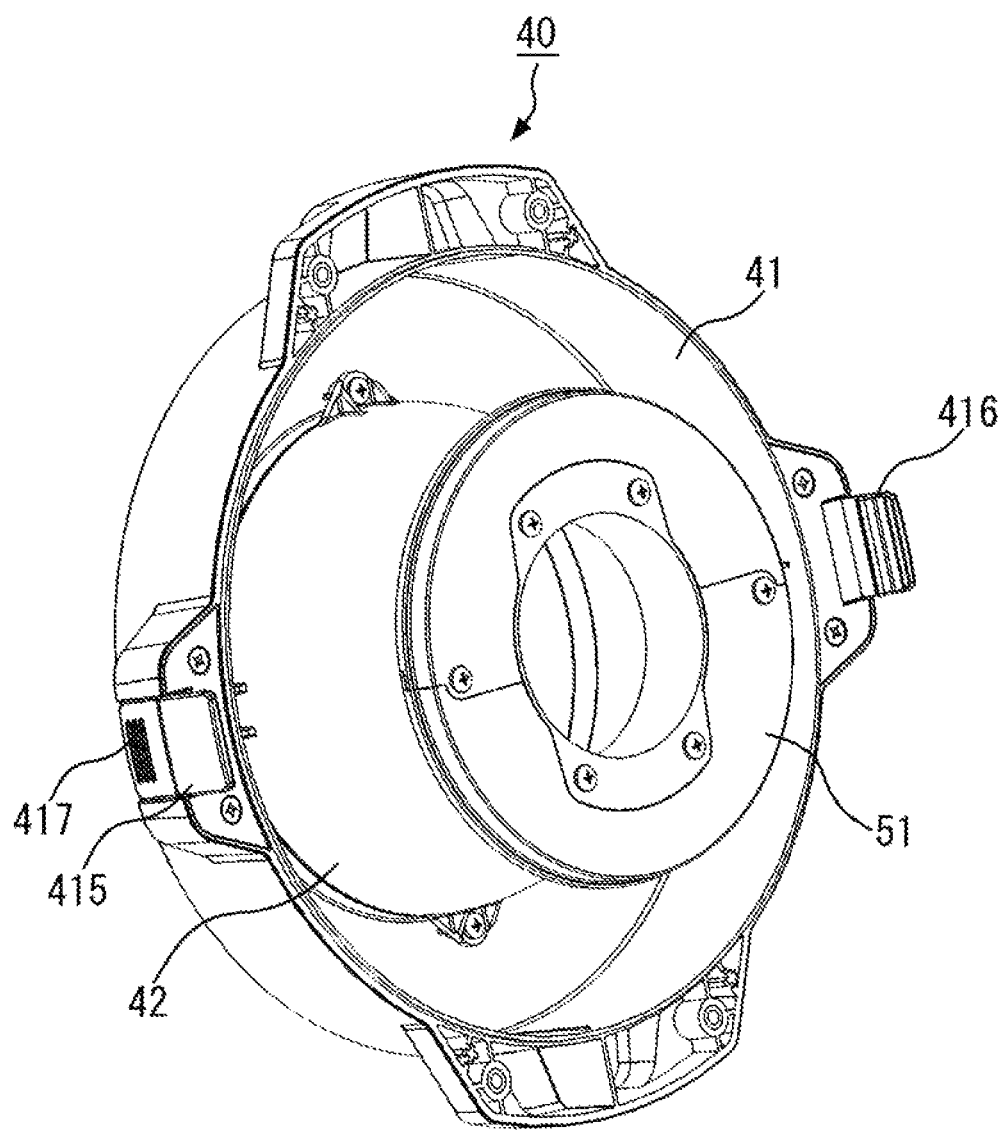
FIG. 11 is a perspective view of an attachment for dome illumination according to the first embodiment of the invention.

With reference to FIGS. 10 and 11, the attachment 40 for dome illumination in which the dome member 42, the plate member 51, and the dome cover 41 are integrated will be described. FIG. 10 is a view in which the plate member 51 is fitted to the dome member 42, and FIG. 11 is a perspective view of the attachment 40 for dome illumination. First, with reference to FIG. 10, fitting between the dome member 42 and the plate member 51 will be described. First, the plate member 51 and the dome member 42 face each other such that a reflecting-member fitted surface 57 of the plate member 51 on which the reflecting member is fitted is located on a dome member 42 side. Then, while the notches 54 of the plate member 51 are engaged with the rib sections 48 of the connecting sections 47 formed at the end section of the extended section 46 of the dome member 42, the extended section 46 of the dome member 42 is sandwiched by the plate member 51 divided into two pieces, the fastening member is inserted into the fastening hole C, and thus the plate member 51 is integrated. In a state where the plate member 51 is integrated, the plate member 51 and the dome member 42 are positioned by the rib sections 48 and the projecting section 49. As a result, the fastening hole A1 formed in the connecting section 47 of the extended section 46 of the dome member 42 and the fastening hole A2 of the plate member 51 are more likely to be aligned with each other. The fastening member is inserted into the fastening hole A1 of the dome member 42 and the fastening hole A2 of the plate member 51, and thus the dome member 42 and the plate member 51 are integrated.

Next, with reference to FIG. 11, fitting between the dome member 42 and the dome cover 41 will be described. The fastening member is inserted into the fastening hole B1 of the attaching section 50 formed in the large-diameter section 44 of the dome member 42 and the fastening hole B2 formed in the peripheral section of the opening section 411 of the dome cover 41, and thus the dome member 42 and the dome cover 41 are fixed to each other. As is apparent from FIG. 11, all the fastening member for fixing the divided plate member 51, the fastening member for fixing the plate member 51 and the dome cover 41, and the fastening member for fixing the dome member 42 and the dome cover 41 are inserted from the inside of the dome cover 41. In other words, along the center axis CJ2 of the dome member 42, the respective fastening members are inserted into the fastening holes in a direction from the small-diameter section 43 to the large-diameter section 44 of the dome member 42. In a use state, the outer surface of the dome cover 41 is a surface facing the workpiece W to be inspected. Therefore, a structure without a fastening hole on the outer surface as in the present embodiment is effective in that there is no possibility that the fastening member will be loosened to fall and will be mixed in an object to be inspected.

As described above, when the dome member 42, the plate member 51, and the dome cover 41 are integrated, the attachment 40 for dome illumination is completed. By fitting the attachment 40 for dome illumination to the ring-shaped illumination device 20, the ring-shaped illumination device 20 can be made into the dome-shaped illumination device 60.

Dome-Shaped Illumination Device 60

Figure 12:
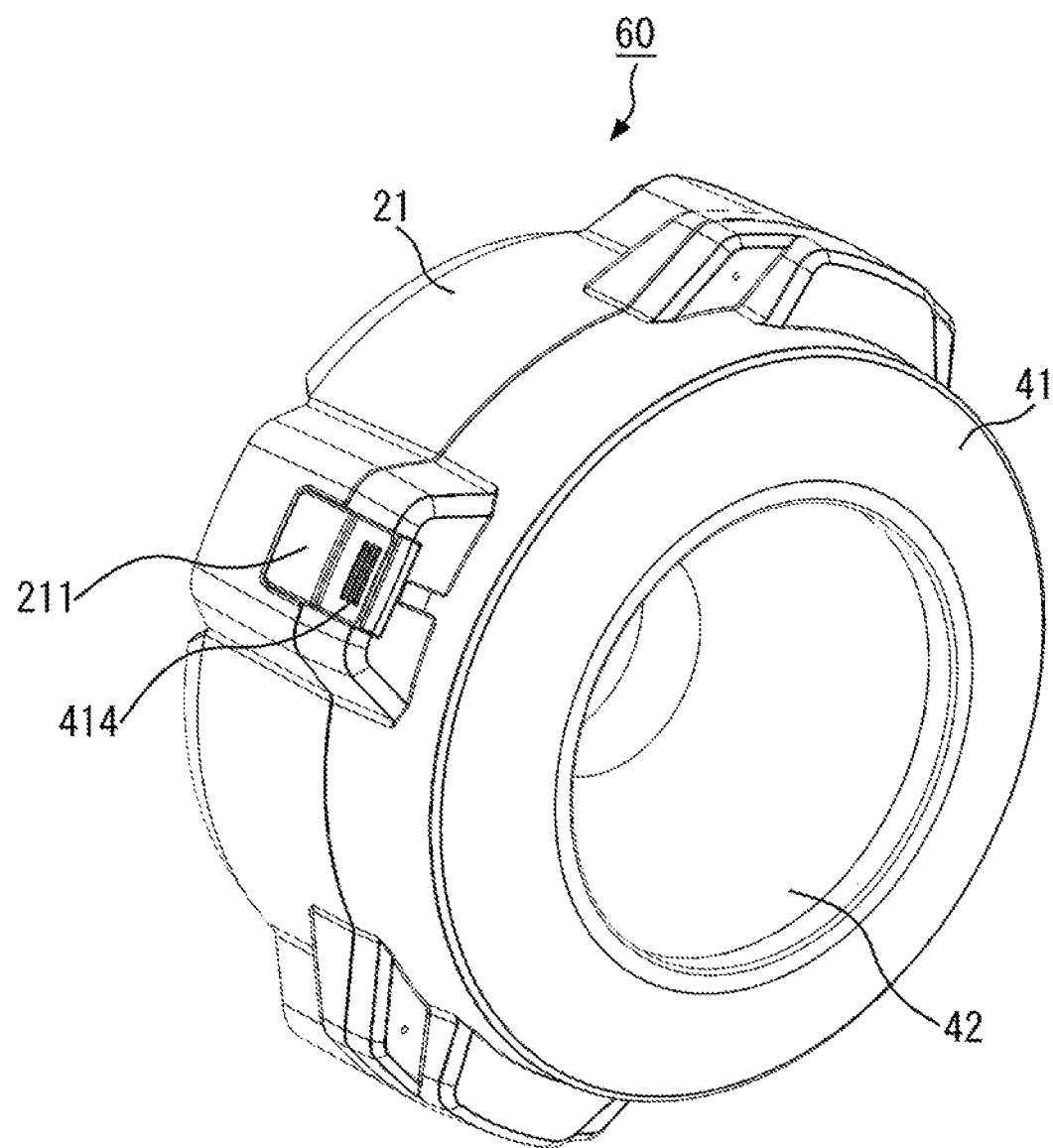
FIG. 12 is a perspective view of a dome-shaped illumination device according to the first embodiment of the invention.

When the attachment 40 for dome illumination is attached to the ring-shaped illumination device 20, the dome-shaped illumination device 60 as illustrated in FIG. 12 is obtained. More specifically, the ring-shaped illumination device 20 and the attachment 40 for dome illumination are disposed such that the front surface 24 of the ring-shaped illumination device 20 and the inner surface of the attachment 40 for dome illumination face each other, and the ring-shaped illumination device 20 and the attachment 40 for dome illumination are coupled to each other. Then, a push section 417 of the fixing section 414 of the dome cover 41 is pressed to rotate the lock lever 415 about a fulcrum (not illustrated), and the key section 416 of the lock lever 415 is engaged with the engagement groove 212 of the main case 21. Thus, the main case 21 and the dome cover 41 are fixed to each other, and the dome-shaped illumination device 60 is completed.

Light from the annularly arranged LEDs 221 inside the main case 21 passes through the dome member 42, and the light passed through the dome member 42 and diffused is emitted from the opening section 411 of the dome cover 41. The workpiece W is irradiated with the emitted light. The imaging unit KM captures an image of the workpiece W irradiated with the light through the hollow section CK1 of the ring-shaped illumination device 20, the small-diameter section 43 and the large-diameter section 44 of the dome member 42, and the opening section 411 of the dome cover 41.

The dome-shaped illumination device 60 in which the attachment 40 for dome illumination is fitted to the ring-shaped illumination device 20 will be described with reference to the cross-sectional view of the dome-shaped illumination device 60 in FIG. 13. The configuration of the ring-shaped illumination device 20 described with reference to FIG. 3 will not be described here. The center axis CJ2 of the dome member 42 and the center axis CJ1 of the hollow section CK1 of the main case 21 substantially match with each other. At that same time, the small-diameter section 43 of the dome member 42 is positioned on a side of the space where the imaging unit KM is disposed with respect to the large-diameter section 44 of the dome member 42, along a line of the center axis CJ1 of the hollow section CK1 of the main case 21. As a result, the plurality of LEDs 221 annularly arranged in the main case 21 and the dome member 42 are arranged in this order toward the internal space NK of the dome member 42.

The plate member 51 is positioned at a location separated by at least the second distance from the light emitting front end section 291 in the direction toward the LED arrangement surface 22. The light emitting rear end section 292 is separated by the second distance from the light emitting front end section 291. The plate member 51 is connected to the main case 21 of the ring-shaped illumination device 20. Thus, the gap formed between the small-diameter section 43 of the dome member 42 and the rear surface opening section 251 of the ring-shaped illumination device 20 is covered when viewed from the space where the imaging unit KM is disposed. In addition, the large-diameter section 44 of the dome member 42 is positioned at a location separated by at least the first distance from the LED arrangement surface 22 in the direction toward the front surface 24 of the ring-shaped illumination device 20. The light emitting front end section 291 is separated by the first distance from the LED arrangement surface 22. The large-diameter section 44 is connected to the main case 21 of the ring-shaped illumination device 20. Thus, only light emitted from the plurality of LEDs 221 emitted through the light emitting opening section 29 of the main case 21 is guided to the internal space NK of the dome member 42 via the dome member 42. Then, the light guided to the internal space NK of the dome member 42 is emitted from the opening of the large-diameter section 44, and the workpiece W is irradiated with the light.

In the present embodiment, the small-diameter section 43 of the dome member 42 is disposed between the LED arrangement surface 22 and the front surface 24 of the main case 21, and the large-diameter section 44 of the dome member 42 is disposed on a side where the workpiece W is disposed, lower than the front surface 24 of the main case 21. The outer peripheral end section 54 of the plate member 51 is connected to the main case 21 at a location separated by at least the second distance from the light emitting front end section 291. More specifically, the plate member 51 is positioned on a plane substantially flush with the LED arrangement surface 22, and is connected to the small-diameter section 43 of the dome member 42 via the extended section 46 of the dome member 42. The outer peripheral end section 54 of the plate member 51 is connected to the light emitting rear end section 292 of the main case 21 of the ring-shaped illumination device 20. In addition, the end section of the outer wall section 413 of the dome cover 41 of the attachment 40 for dome illumination is connected to the end section of the outer wall section 26 of the main case 21, located on the front surface 24 of the ring-shaped illumination device 20.

With this configuration, the light shielding space is formed over the entire periphery by the main case 21 of the ring-shaped illumination device 20, the plate member 51, the dome member 42, and the dome cover 41. This light shielding space allows only light from the LEDs 221 annularly arranged in the main case 21 of the ring-shaped illumination device 20 to be emitted to the internal space NK of the dome member, 42 via the dome member 42.

As described above, in the present embodiment, the small-diameter section 43 of the dome member 42 is positioned on the front surface 24 side of the main case 21 with respect to the LED arrangement surface 22. The reason for adopting this structure is as follows. Light from the LEDs 221 disposed on the illumination board 222 is mainly emitted downward and the light in the horizontal direction becomes relatively weaker. If light emitted in the horizontal direction from the LEDs 221 is used as a main light component passing through the dome member 42, the vicinity of the top section of the dome member 42 where light in the horizontal direction mainly passes through becomes relatively darker than the vicinity of a base section where light directed downward mainly passes through. Therefore, uniform light cannot be emitted from the dome member 42. Therefore, in order to use light directed downward from the LEDs 221 in lieu of light directed in the horizontal direction from the LEDs 221, as the main light component passing through the dome member 42, the small-diameter section 43 of the dome member 42 is arranged on the front surface 24 side of the main case 21 with respect to the LED arrangement surface 22.

In the present embodiment, since the end section of the extended section 46 of the dome member 42 is connected to the inner peripheral end section 53 of the plate member 51 positioned on the LED arrangement surface 22, the small-diameter section 43 of the dome member 42 is positioned on the front surface 24 side of the main case 21 with respect to the LED arrangement surface 22. However, the invention is not limited to this configuration, and the main case 21 of the ring-shaped illumination device 20 and the small-diameter section 43 of the dome member 42 may be directly connected to each other by the plate member 51, and the small-diameter section 43 of the dome member 42 may be positioned on the front surface 24 side of the main case 21 with respect to the LED arrangement surface 22.

In the present embodiment, light emitted from the plurality of LEDs 221 arranged on the illumination board 222 is diffused by the diffusion cover 223, then is diffused again by the dome member 42, and is emitted from the opening of the large-diameter section 44 of the dome member 42. However, the invention is not limited to this configuration, and the diffusion cover 223 may be removed when the attachment 40 for dome illumination is fitted. By fitting the attachment 40 for dome illumination in a state where the diffusion cover 223 is removed, it is possible to prevent the amount of light from being reduced by the diffusion cover 223. Therefore, a greater amount of light can be secured and light can be emitted from the opening of the large-diameter section 44 of the dome member 42.

Other Embodiments

In the above-described embodiment, the ring-shaped illumination device 20 emits light from the LEDs 221 mainly in the downward direction. However, the invention is not limited to this configuration, and as illustrated in a second embodiment in FIG. 14, a main case 21a having a U-shaped cross section may be provided, and light may be emitted in the horizontal direction from LEDs 221a annularly arranged to a hollow section CK1 where a center axis CJ1 of the main case 21a is located. In the case of the second embodiment, an end section on a rear surface 25a side of an inner wall section 28a of the main case 21a is a light emitting rear end section 292a, and an end section on a front surface 24a side of the inner wall section 28a of the main case 21a is a light emitting front end section 291a. In addition, in the second embodiment, unlike in the first embodiment, LEDs are not provided on an identical LED board. In this case, regarding an LED arrangement surface as an invention, a plane including the plurality of LEDs 221a arranged on a circumference is defined as an LED arrangement surface 22a. A first distance indicates the distance between the LED arrangement surface 22a and a front surface 24a of the main case 21a where the light emitting front end section 291a is provided. A second distance indicates the distance between the front surface 24a of the main case 21a where the light emitting front end section 291a is provided and a rear surface 25a of the main case 21a where the light emitting rear end section 292a is provided.

Figure 15:
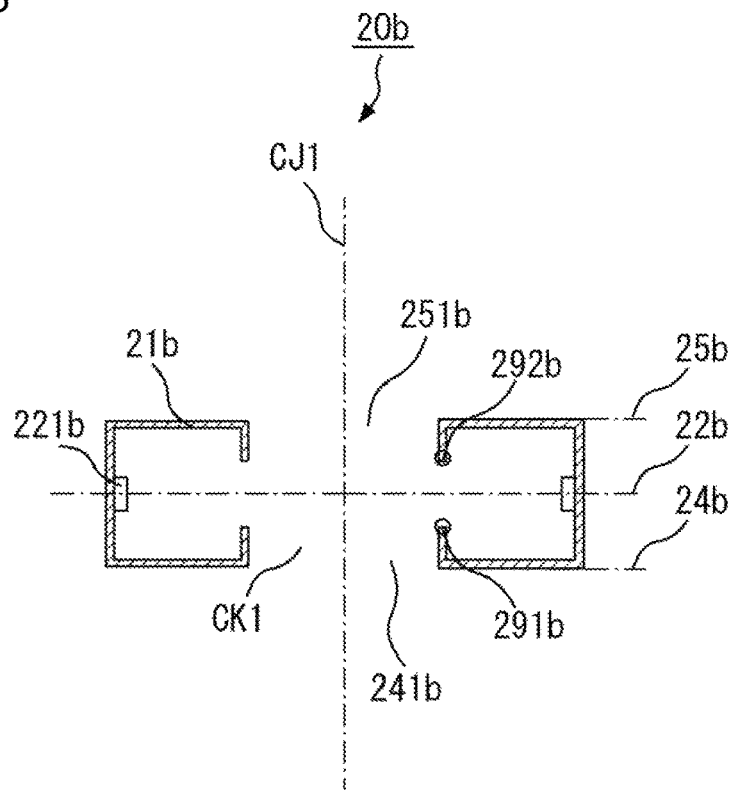
FIG. 15 is a cross-sectional view of a ring-shaped illumination device according to a third embodiment of the invention.

In addition, as illustrated in a third embodiment in FIG. 15, a ring-shaped illumination device 20b may include a main case 21b in which a light emitting front end section 291b is disposed at a location separated from a front surface 24b of an inner wall section 28b of the main case 21b toward an LED arrangement surface 22b along a center axis CJ1 of a hollow section CK1 of the main case 21b, and a light emitting rear end section 292b is disposed at a location separated from the front surface 24b of the inner wall section 28b of the main case 21b toward the LED arrangement surface 22b along the center axis CJ1 of the hollow section CK1 of the main case 21b. A first distance indicates the distance between the LED arrangement surface 22b and the light emitting front end section 291b, and a second distance indicates the distance between the light emitting front end section 291b and the light emitting rear end section 292b. Note that the definition of the LED arrangement surface 22b in the third embodiment is also identical to the definition of the LED arrangement surface described in the second embodiment.

Figure 16:
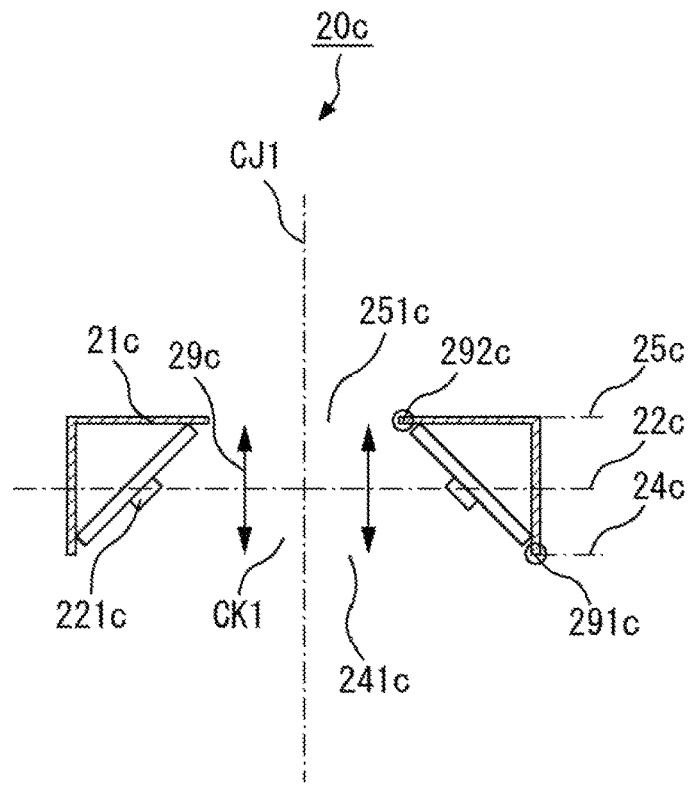
FIG. 16 is a cross-sectional view of a ring-shaped illumination device according to a fourth embodiment of the invention.

In addition, as illustrated in a fourth embodiment of FIG. 16, a ring-shaped illumination device 20c may include a main case 21c having an L-shaped cross section, and an illumination board 222c may be arranged obliquely. In the case of the fourth embodiment, an end section on a rear surface 25c side of an inner wall section 28c of the main case 21c is a light emitting rear end section 292c, and an end section on a front surface 24c side of an outer wall section 26c of the main case 21c is a light emitting front end section 291c. Even in the fourth embodiment, the light emitting opening section 29c indicates the space between the light emitting rear end section 292c and the light emitting front end section 291c, and light from annularly arranged LEDs 221c is emitted through the light emitting opening section 29c via a hollow section CK1 in a center axis CJ1 direction obliquely downward. Note that the definition of an LED arrangement surface 22c in the fourth embodiment is also identical to the definition of the LED arrangement surface described in the second embodiment.

Figure 17:
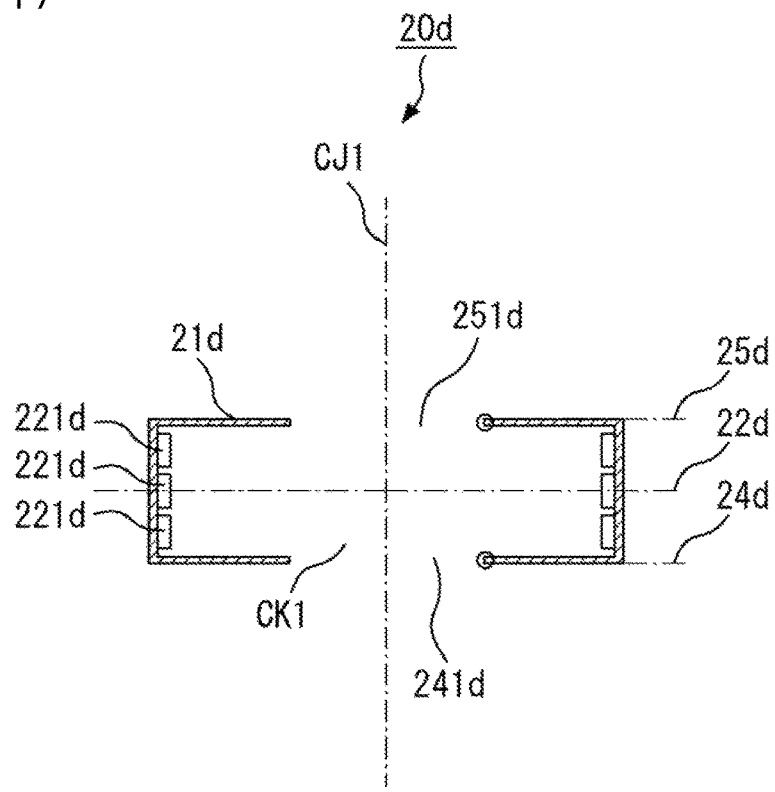
FIG. 17 is a cross-sectional view of a ring-shaped illumination device according to a fifth embodiment of the invention.

In the above-described embodiment, the plurality of LEDs 221 is arranged on an identical plane. However, the invention is not limited to this configuration, and as illustrated in FIG. 17, a plurality of LEDs 221d may be arranged on a plurality of planes. In this case, an LED arrangement surface 22d refers to a plane closest to the middle between a front surface 24d and a rear surface 25d of the main case 21d, from among the plurality of planes on which the LEDs 221d are arranged.

In other words, the light emitting rear end section 292 is located at the upper limit of the light emitting location, and the light emitting front end section 291 is located at the lower limit of the light emitting location. In a case where the plurality of LEDs 221 is arranged downward, the height position of the light emitting rear end section 292 and the height position of the LED arrangement surface 22 substantially match with each other. However, as in the second to fourth embodiments, depending on the orientation of the plurality of LEDs 221, the height position of the light emitting rear end section 292 and the height position of the LED arrangement surface 22 do not necessarily match with each other.

Figure 14:
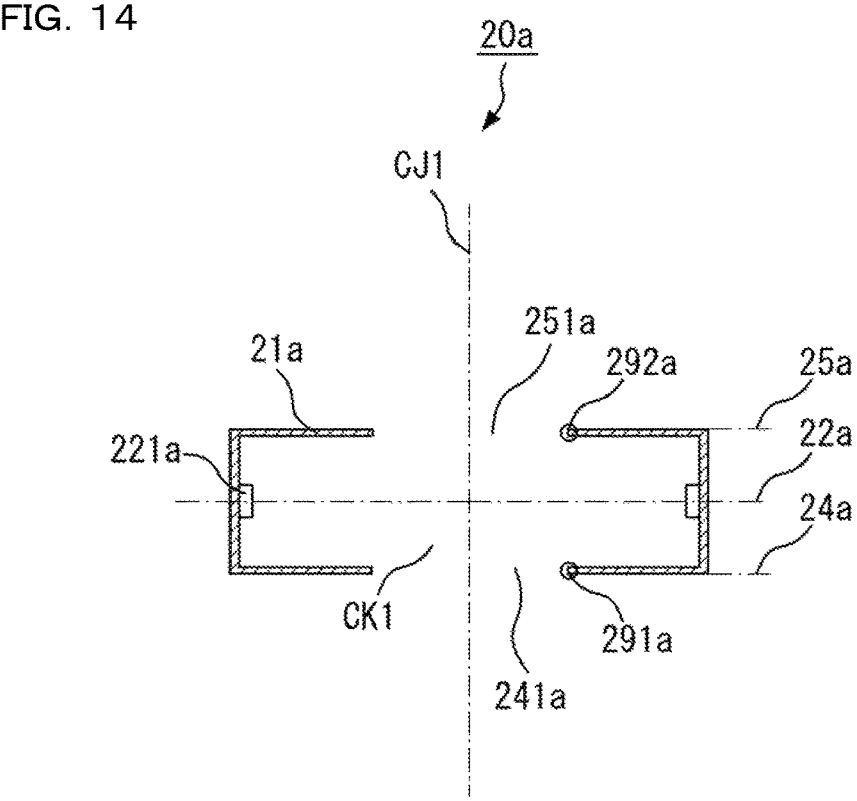
FIG. 14 is a cross-sectional view of a ring-shaped illumination device according to a second embodiment of the invention.
Figure 18:
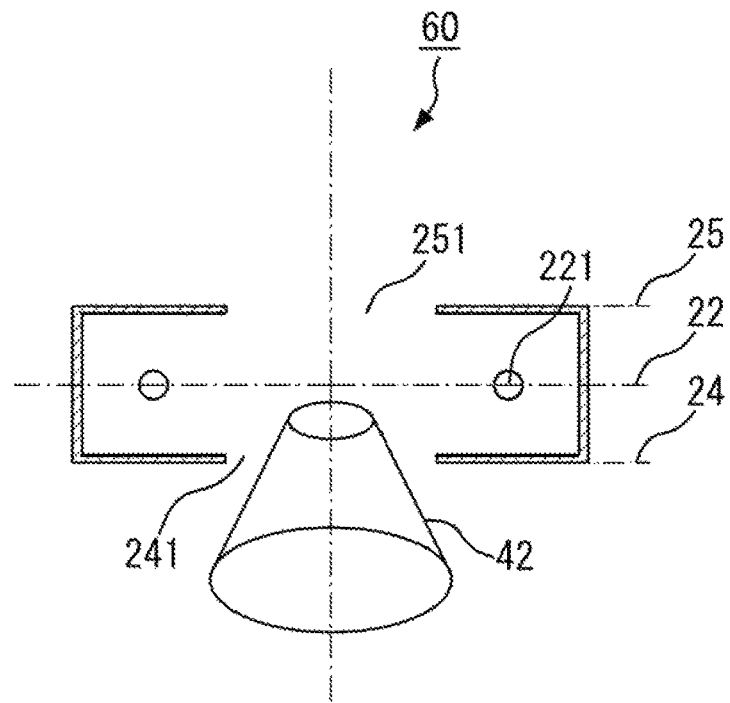
FIG. 18 is a schematic view illustrating a positional relationship between the ring-shaped illumination device and the dome member according to the first embodiment of the invention.
Figure 19:
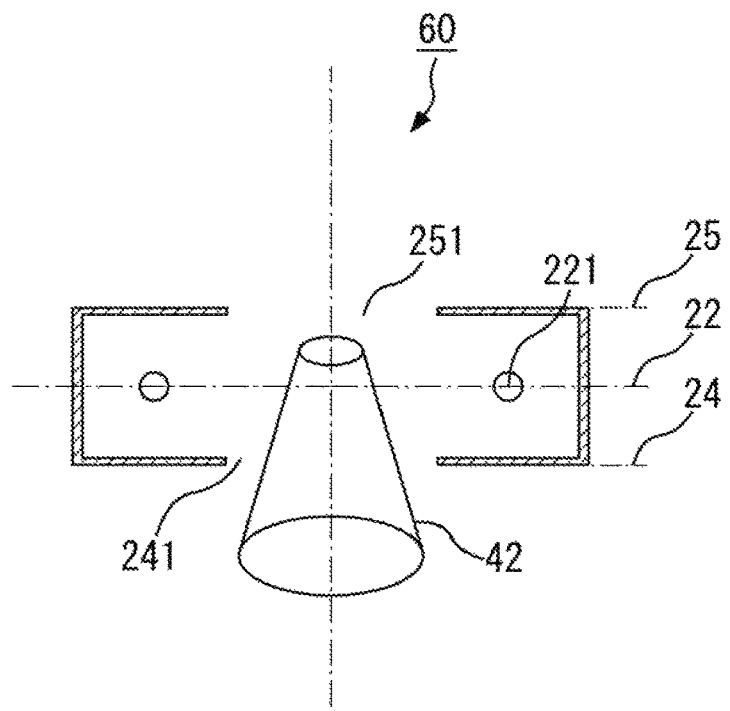
FIG. 19 is a schematic view illustrating a positional relationship between the ring-shaped illumination device and a dome member according to the second embodiment of the invention.
Figure 20:
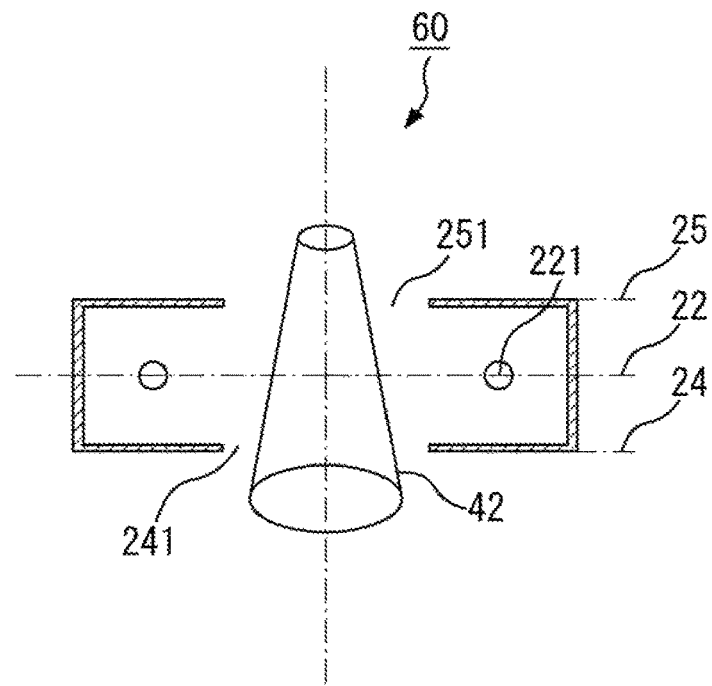
FIG. 20 is a schematic view illustrating a positional relationship between the ring-shaped illumination device and a dome member according to the third embodiment of the invention.
Figure 21:
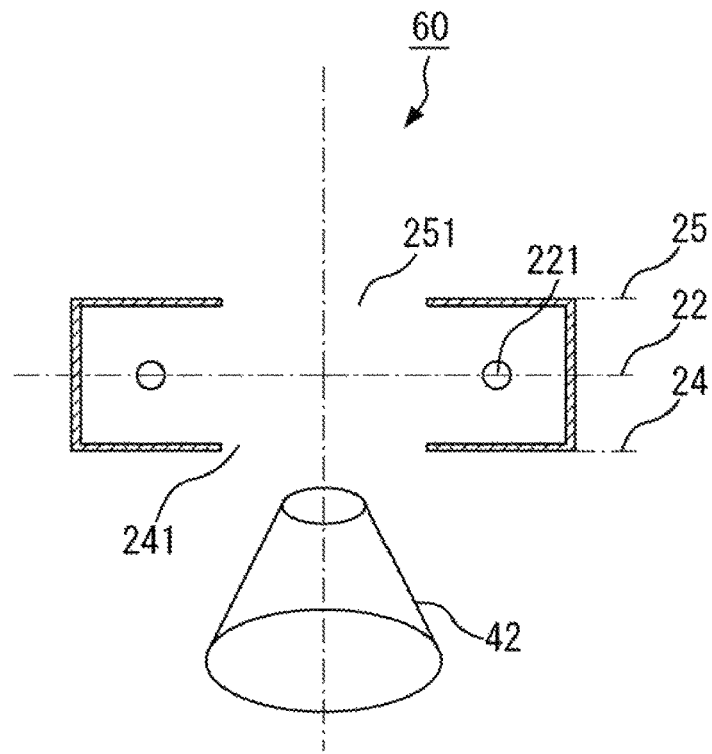
FIG. 21 is a schematic view illustrating a positional relationship between the ring-shaped illumination device and a dome member according to the fourth embodiment of the invention.

In the state where the attachment 40 for dome illumination is fitted to the ring-shaped illumination device 20 in the above embodiment, as illustrated in FIG. 18, the small-diameter section 43 of the dome member 42 is disposed between the LED arrangement surface 22 and the front surface 24 of the main case 21, and the large-diameter section 44 of the dome member 42 is disposed on a workpiece W side with respect to the front surface 24 of the main case 21. However, the positions of the small-diameter section 43 and the large-diameter section 44 of the dome member 42 on the center axis CJ1 of the hollow section CK1 of the main case 21 are not limited to the above-described positions. For example, the small-diameter section 43 may be disposed between the LED arrangement surface 22 and the rear surface 25 of the main case 21, and the large-diameter section 44 may be disposed on a side of the space where the workpiece W is disposed with respect to the front surface 24 of the main case 21 (see FIG. 19). Alternatively, the small-diameter section 43 is disposed on a side of the space where the imaging unit KM is arranged with respect to the rear surface 25 of the main case 21, and the large-diameter section 44 is disposed on the side of the space where the workpiece W is disposed with respect to the front surface 24 of the main case 21 (see FIG. 20). In addition, both of the small-diameter section 43 and the large-diameter section 44 may be arranged on the side of the space where the workpiece W is disposed with respect to the front surface 24 of the main case 21 (see FIG. 21). In each case, the small-diameter section 43 is located on a side of a space where the imaging unit KM is disposed with respect to the large-diameter section 44. In addition, in the above-described first embodiment and the embodiments described with reference to FIGS. 14 to 19, the main case 21 includes, in addition to the outer wall section 26, the upper wall section 27, the inner wall section 28, and a lower wall section (member in which the light emitting front end section denoted by reference sign 291a in FIG. 14 is formed). However, the main case 21 may have any configuration as long as at least the outer wall section 26 is provided.

In the above-described embodiment, the outer peripheral end section 54 of the plate member 51 is connected to the light emitting rear end section 292 of the main case 21. However, the invention is not limited to this configuration, and the outer peripheral end section 54 may be connected to the inner wall section 28 of the main case 21, or the rear surface 25 side of the main case 21. In addition, a connection method may be either a method of fixing with a fastening member or a method of forming a screw section on the inner wall section 28 of the ring-shaped illumination device 20 and screwing and fixing the plate member 51 to the screw section. In a case where the attachment 40 for dome illumination and the ring-shaped illumination device 20 are fixed between the dome cover 41 and the main case 21, it is not necessary to fix the plate member 51 and the main case 21 to each other.

In the above-described embodiment, the fixing section 414 of the outer wall section 413 of the dome cover 41 engages with the engagement groove 212 formed in the main case 21 of the ring-shaped illumination device 20, and therefore the dome cover 41 and the ring-shaped illumination device 20 are fixed to each other. However, the invention is not limited to this configuration, and a method of fixing with a fastening member or a method of forming a screw section on the outer wall section 26 of the ring-shaped illumination device 20 and screwing and fixing the dome cover 41 to the screw section may be adopted. In a case where the attachment 40 for dome illumination and the ring-shaped illumination device 20 are fixed between the plate member 51 and the main case 21, it is not necessary to fix the dome cover 41 and the main case 21 to each other.

Figure 13:
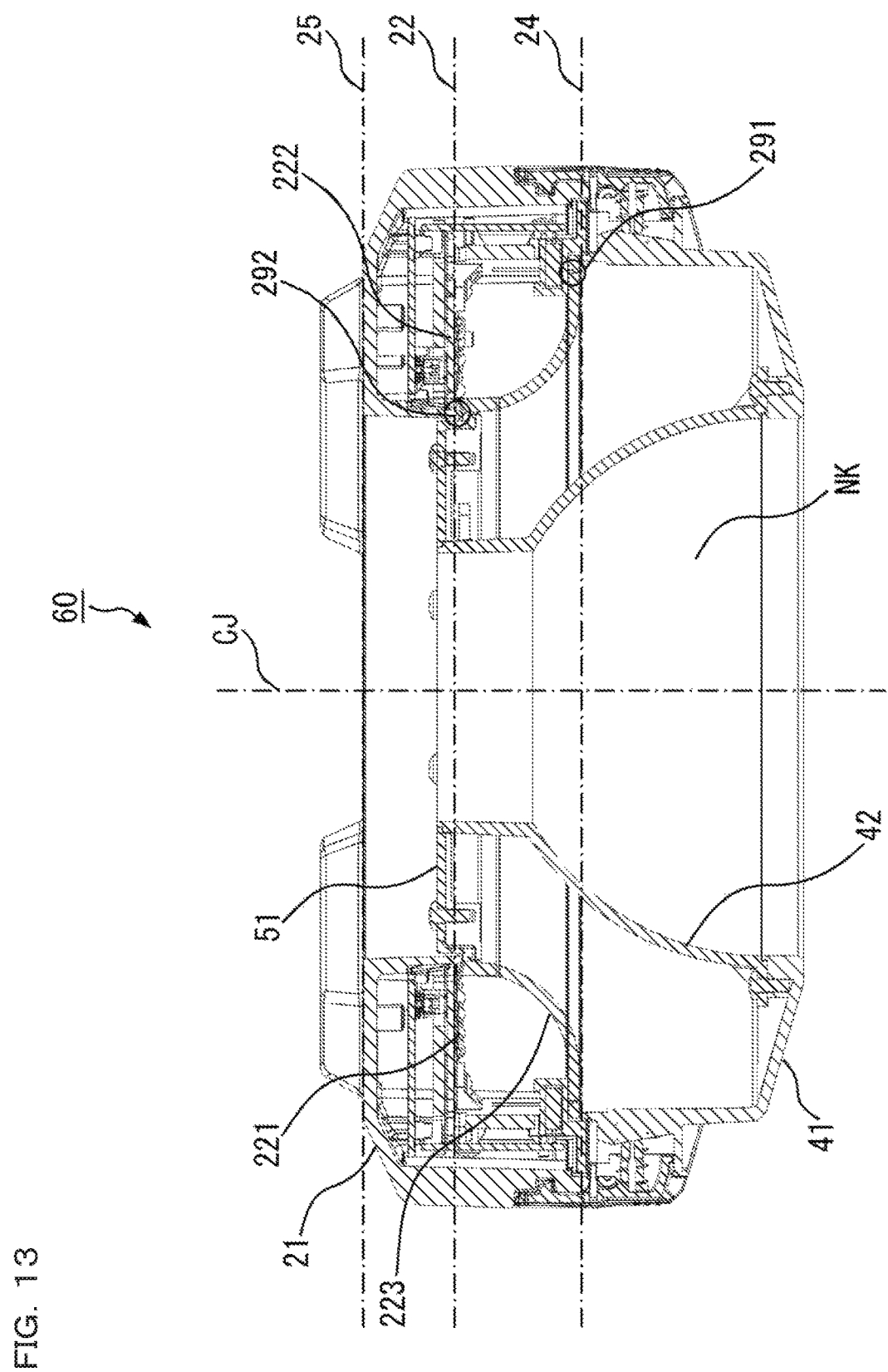
FIG. 13 is a cross-sectional view of the dome-shaped illumination device according to the first embodiment of the invention.
Figure 22:
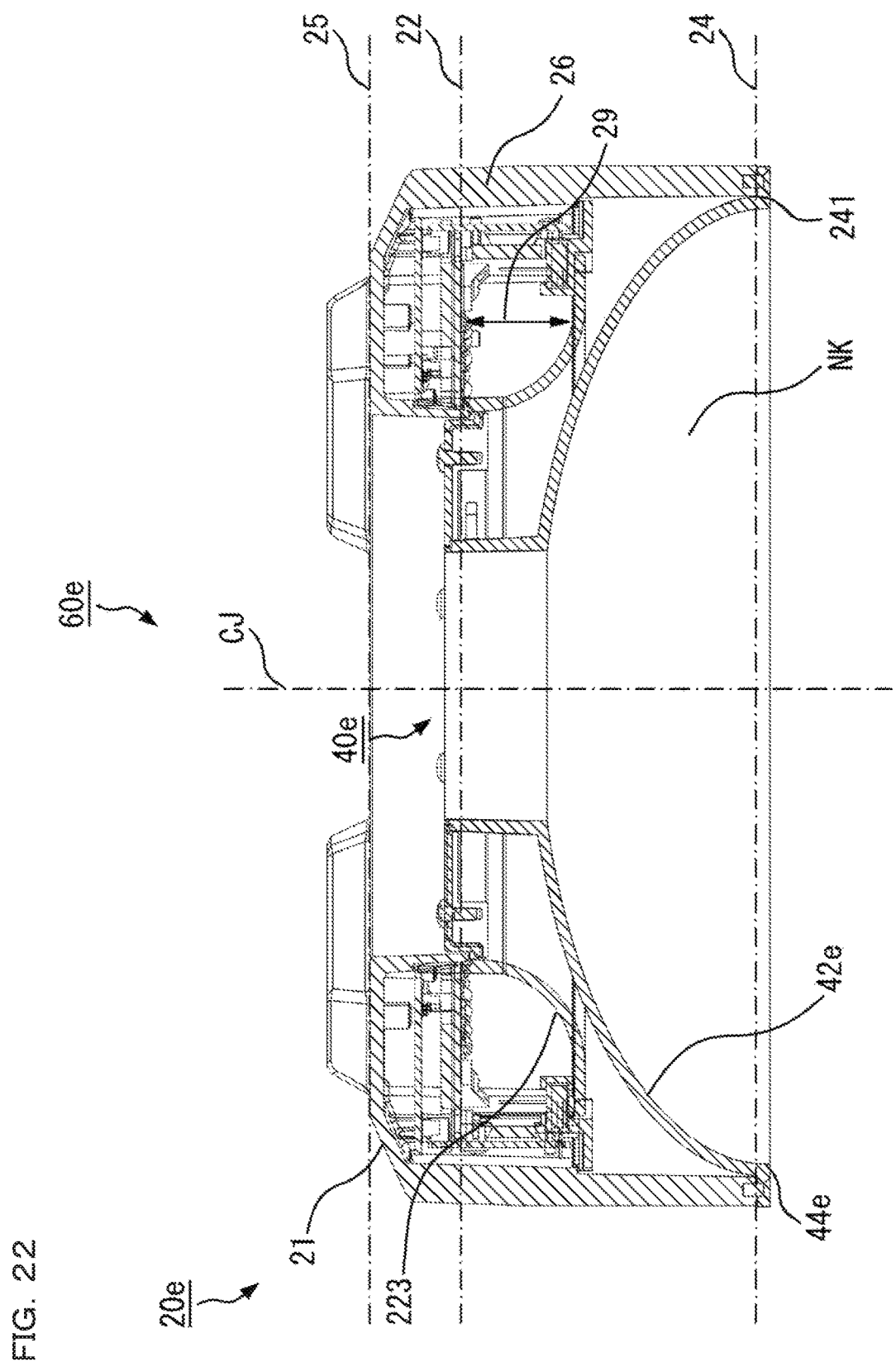
FIG. 22 is a cross-sectional view of a dome-shaped illumination device according to a modification of the first embodiment of the invention.

In the above-described embodiment, as illustrated in FIG. 13, the dome member 42 is connected to the main case 21 via the dome cover 41. However, the invention is not limited to this configuration, and as illustrated in FIG. 22, the dome member 42 may be directly connected to the main case 21. For example, as illustrated in FIG. 22, the outer wall section 26 of the main case 21 of the ring-shaped illumination device 20 is extended downward to position the front surface opening section 241 further forward and the large-diameter section 44 of the dome member 42 is widened to the size of the front surface opening section 241. Therefore, when an attachment 40e for dome illumination is attached to a ring-shaped illumination device 20e, an annular end section of a large-diameter section 44e of a dome member 42e and an annular end section of a front surface opening section 241e can be positioned so as to be connectable to each other.

As illustrated in FIG. 22, a dome-shaped illumination device 60e, which is a modification of the first embodiment, is completed, for example, by screwing from outside. According to this modification, when the dome member 42e is fitted to the ring-shaped illumination device 20e, the space between an annular end section of the large-diameter section 44e of the dome member 42e and an annular end section of the front surface opening section 241e of the ring-shaped illumination device 20e can be covered. Therefore, even in such an embodiment, only light emitted from a light emitting opening section 29 of a ring-shaped illumination device 20 can be incident on a dome member 42.

In the embodiment described above, the diameter of the large-diameter section 44 of the dome member 42 is set to be substantially equal to the diameter of the rear surface opening section 251 of the ring-shaped illumination device 20. However, the invention is not limited to this, and the diameter of the large-diameter section 44 of the dome member 42 may be larger than the diameter of the rear surface opening section 251 of the main case 21 in a case where a light shielding member is provided on part of the dome member 42 located lower than the LEDs 221 disposed in the main case 21 even if the diameter of the large-diameter section 44 of the dome member 42 is larger than the diameter of the rear surface opening section 251 of the main case 21.

In the above-described embodiment, the main case 21 has a substantially annular shape; however, the main case 21 may have a polygonal shape. In addition, the plate member 51 is formed separately from the dome member 42; however, the plate member 51 may be formed integrally with the dome member 42. In addition, in the present embodiment, the ring-shaped illumination device 20 includes the LEDs in eight colors; however, the invention is not limited to this configuration, and the ring-shaped illumination device 20 may include LEDs 221 in a single color or LEDs 221 in colors other than the eight colors.

The attachment for the illumination device according to the invention can be used for selecting an appropriate illumination device by connecting each of different types of illumination devices to an appearance inspection apparatus, performing a trial inspection, and comparing captured images.

What is claimed is:

1. An attachment for an illumination device detachably attached to a ring-shaped illumination device, the ring-shaped illumination device including: a main case that includes a first opening section which is a substantially circular opening formed on an upper surface, a second opening section which is a substantially circular opening formed on a lower surface and which has a first center axis common to the first opening section, and a first hollow section which includes the first center axis and is connected to the first opening section and the second opening section; a plurality of light-emitting elements that is annularly arranged in the main case so as to surround the first hollow section; and a light emitting opening section that is an opening having a substantially annular shape whose center is located on the first center axis and having a width in a vertical direction of the main case, the light emitting opening section guiding light emitted from the plurality of light emitting elements downward of the first center axis from the first hollow section, the attachment for the illumination device comprising:

a dome member that includes a small-diameter opening section which has an substantially annular shape and has an opening diameter smaller than a diameter of the first opening section of the ring-shaped illumination device, a large-diameter opening section which has a substantially annular shape, has a second center axis common to the small-diameter opening section, and has an opening diameter larger than the opening diameter of the small-diameter opening section, and a side-surface section which has a contour shape widening from the small-diameter opening section to the large-diameter opening section along the second center axis and has a second hollow section inside, and at least a part of which transmits light from outside while diffusing the light to the second hollow section, the small-diameter opening section being inserted into the first hollow section of the ring-shaped illumination device from the second opening section to the first opening section of the ring shaped illumination device in a state where the second center axis common to the small-diameter opening section and the large-diameter opening section substantially matches the first center axis of the ring-shaped illumination device when the attachment for the illumination device is fitted to the ring-shaped illumination device; and a first shielding member that includes a first inner peripheral end section which is connected to the small-diameter opening section of the dome member after the dome member is fitted to the ring-shaped illumination device, extends over an entire periphery from the first inner peripheral end section in a direction perpendicular to the center axis of the small-diameter opening section, covers a space formed between an annular end section of the small-diameter opening section of the dome member and an annular end section of the first opening section of the ring-shaped illumination device, and is connected to the ring-shaped illumination device, wherein the annular end section of the large-diameter opening section of the dome member engages with the ring-shaped illumination device so as to cover a space formed between the annular end section of the large-diameter opening section of the dome member and the annular end section of the second opening section of the ring-shaped illumination device when the dome member is fitted to the ring-shaped illumination device.

2. The attachment for the illumination device according to claim 1, further comprising a second shielding member that includes a second inner peripheral end section connected to the large-diameter opening section of the dome member when the dome member is attached to the ring-shaped illumination device, extends over an entire periphery from the second inner peripheral end section in a direction perpendicular to the center axis of the large-diameter opening section, covers a space formed between the annular end section of the large-diameter opening section of the dome member and the annular end section of the second opening section of the ring-shaped illumination device, and is connected to the ring-shaped illumination device.

3. The attachment for the illumination device according to claim 1, wherein the light emitting opening section of the ring-shaped illumination device has a first opening end section and a second opening end section which are end sections having substantially annular shapes whose centers are on the center axis of the first hollow section, and which are provided on an upper limit and a lower limit of a light emission location, respectively, along an inner periphery of the main case, wherein when the attachment for the illumination device is fitted to the ring-shaped illumination device, the first shielding member is connected at one of a height position equal to a height position of the first opening end section and a height position higher than the first opening end section, and the large-diameter opening section of the dome member is connected at one of a height position equal to a height position of the second opening end section and a height position lower than the second opening end section.

4. The attachment for the illumination device according to claim 1, wherein the first shielding member is connected at one of a height position equal to a height position of the first opening section and a height position lower than the first opening section, and wherein the large-diameter opening section of the dome member is connected at a height position equal to a height position of the second opening section and a height position higher than the second opening section.

5. The attachment for the illumination device according to claim 1, wherein the small-diameter opening section of the dome member is positioned lower than a light-emitting element arrangement surface on which the plurality of light-emitting elements is arranged.

6. The attachment for the illumination device according to claim 1, wherein the large-diameter opening section of the dome member has a diameter substantially identical to the diameter of the first opening section.

7. The attachment for the illumination device according to claim 1, wherein in a case where the dome member includes an extended section which is extended upward with respect to the first shielding member, the extended section does not transmit light.

8. The attachment for the illumination device according to claim 1, wherein when the attachment for the illumination device is attached to the ring-shaped illumination device, a reflecting member is fitted to a member constituting a light shielding space formed between the light emitting opening section and the dome member.

9. The attachment for the illumination device according to claim 1, further comprising a second fixing section that detachably engages with a first fixing section provided outside the main case.

* * * * *